US008621396B1

(12) United States Patent
Gossweiler, III

(10) Patent No.: US 8,621,396 B1
(45) Date of Patent: Dec. 31, 2013

(54) ACCESS USING IMAGE-BASED MANIPULATION

(75) Inventor: Richard Carl Gossweiler, III, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 312 days.

(21) Appl. No.: 12/606,465

(22) Filed: Oct. 27, 2009

Related U.S. Application Data

(63) Continuation-in-part of application No. 12/254,325, filed on Oct. 20, 2008.

(51) Int. Cl.
*G06F 3/033* (2013.01)
*G06F 21/00* (2013.01)

(52) U.S. Cl.
USPC .......................................... 715/863; 713/183

(58) Field of Classification Search
USPC ............... 715/863; 726/16–30; 345/619, 649; 713/183
See application file for complete search history.

(56) References Cited

U.S. PATENT DOCUMENTS

| | | | |
|---|---|---|---|
| 5,347,628 A * | 9/1994 | Brewer et al. ................. | 715/775 |
| 6,128,397 A | 10/2000 | Baluja et al. | |
| 6,195,698 B1 * | 2/2001 | Lillibridge et al. ........... | 709/225 |
| 6,278,455 B1 * | 8/2001 | Baker ........................... | 715/716 |
| 6,295,387 B1 | 9/2001 | Burch | |
| 6,956,966 B2 | 10/2005 | Steinberg | |
| 7,149,899 B2 | 12/2006 | Pinkas | |
| 7,266,693 B1 | 9/2007 | Potter | |
| 7,451,323 B2 * | 11/2008 | Abe et al. ..................... | 713/183 |
| 7,624,277 B1 | 11/2009 | Simard et al. | |
| 7,653,944 B2 | 1/2010 | Chellapilla | |
| 7,656,402 B2 | 2/2010 | Abraham et al. | |
| 7,841,940 B2 | 11/2010 | Bronstein | |
| 7,891,005 B1 * | 2/2011 | Baluja et al. .................. | 726/26 |
| 7,908,223 B2 | 3/2011 | Klein et al. | |
| 7,921,454 B2 | 4/2011 | Cerruti | |
| 7,929,805 B2 | 4/2011 | Wang | |
| 8,019,127 B2 | 9/2011 | Misra | |
| 8,024,775 B2 * | 9/2011 | Xu et al. ....................... | 726/2 |
| 8,046,721 B2 * | 10/2011 | Chaudhri et al. ............. | 715/863 |
| 8,073,912 B2 | 12/2011 | Kaplan | |

(Continued)

FOREIGN PATENT DOCUMENTS

WO 2008/091675 A1 7/2008

OTHER PUBLICATIONS

American Heritage Dictionary of the English Language (online), Fourth Edition, copyright 2007 by Houghton Mifflin Co. "figure" definition. 3 pages. Retrieved from http://www.credoreference.com on Aug. 13, 2011.*

(Continued)

*Primary Examiner* — Doon Chow
*Assistant Examiner* — Wilson Varga
(74) *Attorney, Agent, or Firm* — Brake Hughes Bellermann LLP

(57) ABSTRACT

A computer-implemented method may include presenting to a user an image, receiving a manipulated image by the user and providing access to a computing service based on a comparison of the manipulated image to a predefined arrangement of the image. In one exemplary implementation, presenting to the user the image may include presenting to the user a figure, receiving the manipulated image may include receiving a manipulated figure by the user and providing access to the computing service may include providing access to the computing service based on a comparison of the manipulated figure to a predefined arrangement of the figure.

14 Claims, 16 Drawing Sheets

(56) References Cited

U.S. PATENT DOCUMENTS

| | | | |
|---|---|---|---|
| 8,090,219 | B2 | 1/2012 | Gossweiler, III et al. |
| 8,103,960 | B2 | 1/2012 | Hua et al. |
| 8,136,167 | B1 | 3/2012 | Gossweiler, III et al. |
| 8,145,912 | B2* | 3/2012 | McLean ........................ 713/182 |
| 8,196,198 | B1 | 6/2012 | Eger |
| 8,332,937 | B1 | 12/2012 | Eger |
| 8,347,103 | B2* | 1/2013 | Jones et al. .................. 713/184 |
| 8,392,986 | B1 | 3/2013 | Gossweiler, III |
| 2002/0141639 | A1 | 10/2002 | Steinberg |
| 2003/0080842 | A1 | 5/2003 | Sumakeris et al. |
| 2003/0232320 | A1 | 12/2003 | Lee |
| 2004/0073813 | A1* | 4/2004 | Pinkas et al. .................. 713/202 |
| 2004/0199597 | A1* | 10/2004 | Libbey et al. ................. 709/207 |
| 2005/0014118 | A1 | 1/2005 | von Ahn Arellano |
| 2005/0065802 | A1* | 3/2005 | Rui et al. .......................... 705/1 |
| 2005/0229251 | A1* | 10/2005 | Chellapilla et al. ............. 726/23 |
| 2006/0015812 | A1* | 1/2006 | Cunningham et al. ........ 715/535 |
| 2006/0021024 | A1* | 1/2006 | Park ................................ 726/17 |
| 2006/0167874 | A1 | 7/2006 | von Ahn Arellano et al. |
| 2007/0130618 | A1 | 6/2007 | Chen |
| 2007/0192849 | A1 | 8/2007 | Golle et al. |
| 2007/0201745 | A1* | 8/2007 | Wang et al. .................... 382/181 |
| 2007/0234423 | A1 | 10/2007 | Goodman et al. |
| 2008/0050018 | A1 | 2/2008 | Kozlol |
| 2008/0092245 | A1 | 4/2008 | Alward et al. |
| 2008/0216163 | A1 | 9/2008 | Pratte |
| 2008/0244700 | A1 | 10/2008 | Osborn et al. |
| 2009/0046929 | A1* | 2/2009 | De Leon ........................ 382/173 |
| 2009/0077628 | A1 | 3/2009 | Elson et al. |
| 2009/0094687 | A1 | 4/2009 | Jastrebski |
| 2009/0113294 | A1 | 4/2009 | Sanghavi et al. |
| 2009/0138468 | A1 | 5/2009 | Kurihara |
| 2009/0138723 | A1 | 5/2009 | Nyang |
| 2009/0150983 | A1 | 6/2009 | Saxena et al. |
| 2009/0235178 | A1 | 9/2009 | Cipriani et al. |
| 2009/0249476 | A1* | 10/2009 | Seacat ............................ 726/17 |
| 2009/0249477 | A1 | 10/2009 | Punera |
| 2009/0293119 | A1* | 11/2009 | Jonsson .......................... 726/19 |
| 2009/0319274 | A1 | 12/2009 | Gross |
| 2009/0320124 | A1* | 12/2009 | Taxier et al. ................... 726/17 |
| 2009/0325696 | A1 | 12/2009 | Gross |
| 2009/0328150 | A1 | 12/2009 | Gross |
| 2010/0077209 | A1 | 3/2010 | Broder et al. |
| 2010/0077210 | A1 | 3/2010 | Broder et al. |
| 2010/0100725 | A1 | 4/2010 | Ozzie et al. |

OTHER PUBLICATIONS

Hofmueller, J. (ed) et al., RFC 4828, "Request for Comment: The Transmission of IP Datagrams over the Semaphore Flag Signaling System (SFSS)," Network Working Group, The Internet Engineering Task Force (IETF), Apr. 1, 2007. 14 pages. Retrieved from http://tools.ietf.org/pdf/rfc4824.pdf on Apr. 20, 2012.*

Vailaya, A., et al, "Automatic Image Orientation Detection", IEEE Transactions on Image Processing, vol. 11, No. 7, Jul. 2002, pp. 746-755.

Zhang, L., et al, "Boosting Image Orientation Detection with Indoor vs. Outdoor Classification", Proceedings of the Sixth IEEE Workshop on Applications of Computer Vision, Dec. 2002, pp. 95-99.

Von Ahn, L., et al, "Captcha: Using Hard AI Problems for Security", In Proceedings of Eurocrypt- Eurocrypt 2003, pp. 294-311.

Rui, Y., et al, "Characters or Faces: A User Study on Ease of Use for HIPs", In Proceedings of the 2nd International Workshop on Human Interactive Proofs, vol. 3517, Lecture Notes in Computer Science, May 2005, 14 pages.

Chellapilla, K., et al, "Computers Beat Humans at Single Character Recognition in Reading based Human Interaction Proofs (HIPs)", In Proceedings of the Second Conference on Email and Anti-Spam CEAS, (Jul. 2005), 8 pages.

Wu, Victor et al., "Text Finder: An Automatic System to Detect and Recognize Text in Images", IEEE Transactions on Pattern Analysis and Machine Intelligence, Nov. 18, 1997, 36 pages.

Wu, Victor et al., "Finding Text in Images", Proceedings of the 2nd ACM Int'l Conf. on Digital Libraries, 1997, pp. 1-14.

Von Ahn, L., "Games with a purpose", Invisible Computing, vol. 39, No. 6, Jun. 2006, pp. 96-98.

Rowley, H. A., et al, "Rotation Invariant Neural Network-Based Face Detection", CMU-CS-97-201, Dec. 1997, 15 pages.

Von Ahn, L., et al, "Improving Accessibility of the Web With a Computer Game", Proceedings of the SIGCHI Conference on Human Factors in Computing Systems, ACM, Apr. 22-28, 2006, pp. 79-82.

Von Ahn, L., et al, "Labeling Images With a Computer Game", Proceedings of the SIGCHI Conference on Human Factors in Computing Systems, ACM, Apr. 24-29, 2004, pp. 319-326.

Von Ahn, L., et al, "Telling Humans and Computers Apart (Automatically) or How Lazy Cryptographers do AI", Communications on the ACM, vol. 47, No. 2, Feb. 2004, pp. 1-11.

Viola, P., et al, "Rapid Object Detection Using a Boosted Cascade of Simple Features", IEEE of computer Society Conference on Vision and Pattern Recognition TR-2004-043, 2004, 13 pages.

Baluja, S., et al, "Large Scale Performance Measurement of Content-Based Automated Image-Orientation Detection", IEEE Int. Conference on Image Processing, vol. 2, 2005, pp. 514-517.

Mori, G., et al, "Recognizing Objects in Adversarial Clutter: Breaking A Visual CAPTCHA", Proceedings of Computer Vision and Pattern Recognition, 2003, pp. 1-8.

Rowley, H., et al, "Neural Network-Based Face Detection", IEEE Transactions on Pattern Analysis and Machine Intelligence, vol. 20, No. 1, Jan. 1998, pp. 1-28.

Fu, H., et al, "Upright Orientation of Man-Made Objects", SIGGRAPH 2008, 35th International Conference and Exhibition on Computer Graphics and Interactive Techniques, Aug. 2008, 7 pages.

Lopresti, D., "Leveraging the CAPTCHA Problem", 2nd Int'l Workshop on Human Interactive Proofs, May 2005, 15 pages.

"Sampling Information", Minnesota Center for Survey Research—University of Minnesota, 2007, 4 pages.

Siegle, D., "Sample Size Calculator", Neag School of Education—University of Connecticut, retrieved on Sep. 18, 2008, from http://www.gifted.uconn.edu/siegle/research/Samples/samplecalculator.htm, 2 pages.

U.S. Appl. No. 12/254,312, filed Oct. 20, 2008.
U.S. Appl. No. 12/256,827, filed Oct. 23, 2008.
U.S. Appl. No. 12/254,325, filed Oct. 20, 2008.
U.S. Appl. No. 12/345,265, filed Dec. 29, 2008.
U.S. Appl. No. 12/486,714, filed Jun. 17, 2009.

Chew, et al., "Collaborative Filtering CAPTCHA's", HIP 2005, LNCS 3517, May 20, 2005, pp. 66-81.

Extended EP Search Report for EP Application No. 08713263.5, mailed Feb. 4, 2011, 9 pages.

Lopresti, "Leveraging the CAPTCHA Problem", HIP 2005, LNCS 3517, May 20, 2005, pp. 97-110.

Office Action for European Application No. 08713263.5, mailed Dec. 23, 2011, 4 pages.

First Office Action for Chinese Patent Application No. 200880002917.8 (with English Translation), mailed May 12, 2011, 7 pages.

Xu, et al., "Mandatory Human participation: a new authentication scheme for building secure systems", Proceedings of the 12th International Conference on Computer Communications and Networks, Oct. 20, 2003, pp. 547-552.

Shirali-Shahrea, "Collage CAPTCHA", IEEE 2007, 4 pages.

Shirali-Shahrea, "Online Collage CAPTCHA", WIAMIS '07: Eight International Workshop on Image Analysis for Multimedia Interactive Services, 2007, 4 pages.

Non-Final Office Action for U.S. Appl. No. 12/254,325, mailed Sep. 1, 2011, 17 pages.

Non-Final Office Action for U.S. Appl. No. 12/345,265, mailed Oct. 14, 2011, 23 pages.

Restriction Requirement for U.S. Appl. No. 12/254,312, mailed Sep. 14, 2011, 5 pages.

Restriction Requirement Response for U.S. Appl. No. 12/254,312, filed Oct. 14, 2011, 1 page.

Notice of Allowance for U.S. Appl. No. 12/254,312, mailed Nov. 7, 2011, 19 pages.

(56) References Cited

OTHER PUBLICATIONS

Notice of Allowance for U.S. Appl. No. 12/345,265, mailed Feb. 8, 2012, 12 pages.
Non-Final Office Action Response for U.S. Appl. No. 12/345,265, filed Jan. 17, 2012, 11 pages.
Non-Final Office Action for U.S. Appl. No. 12/486,714, mailed on Mar. 2, 2012, 16 pages.
Final Office Action Response for U.S. Appl. No. 12/254,325, filed May 10, 2012, 17 pages.
Non-Final Office Action for U.S. Appl. No. 13/463,423, mailed on Jul. 3, 2012, 24 pages.
Non-Final Office Action Response for U.S. Appl. No. 13/463,423, filed Sep. 25, 2012, 10 pages.
Notice of Allowance for U.S. Appl. No. 12/486,714, mailed on Oct. 3, 2012, 19 pages.
Final Office Action for U.S. Appl. No. 12/254,325, mailed on Feb. 10, 2012, 15 pages.
Non-Final Office Action for U.S. Appl. No. 12/254,325, mailed on Aug. 28, 2012, 19 pages.
Non-Final Office Action Response for U.S. Appl. No. 12/486,714, filed Jun. 4, 2012, 12 pages.
Non-Final Office Action for U.S. Appl. No. 12/524,149, mailed on Sep. 21, 2012, 34 pages.
Luo, et al, "A Probabilistic Approach to Image Orientation Detection via Confidence-Based Integration of Low-Level and Semantic Cues", IEEE Computer Society Conference on Computer Vision and Pattern Recognition Workshops, 2004, 8 pages.
Non-Final Office Action Response for U.S. Appl. No. 12/254,325, filed Nov. 15, 2012, 12 pages.
Notice of Allowance for U.S. Appl. No. 12/486,714, mailed on Nov. 5, 2012, 13 pages.
RCE for U.S. Appl. No. 12/486,714, filed Oct. 19, 2012, 2 pages.
Notice of Allowance for U.S. Appl. No. 13/463,423, mailed on Oct. 16, 2012, 16 pages.
Final Office Action for U.S. Appl. No. 12/254,325, mailed Jan. 22, 2013, 14 pages.
Non-Final Office Action Response for U.S. Appl. No. 12/524,149, filed Jan. 22, 2013, 12 pages.
Advisory Action for U.S. Appl. No. 12/254,325, mailed on Apr. 4, 2013, 3 pages.
Notice of Allowance for U.S. Appl. No. 12/254,325, mailed on May 21, 2013, 9 pages.
RCE for U.S. Appl. No. 12/254,325, mailed on Apr. 12, 2013, 3 pages.
Notice of Allowance for U.S. Appl. No. 12/524,149, mailed on Jun. 3, 2013, 16 pages.

\* cited by examiner

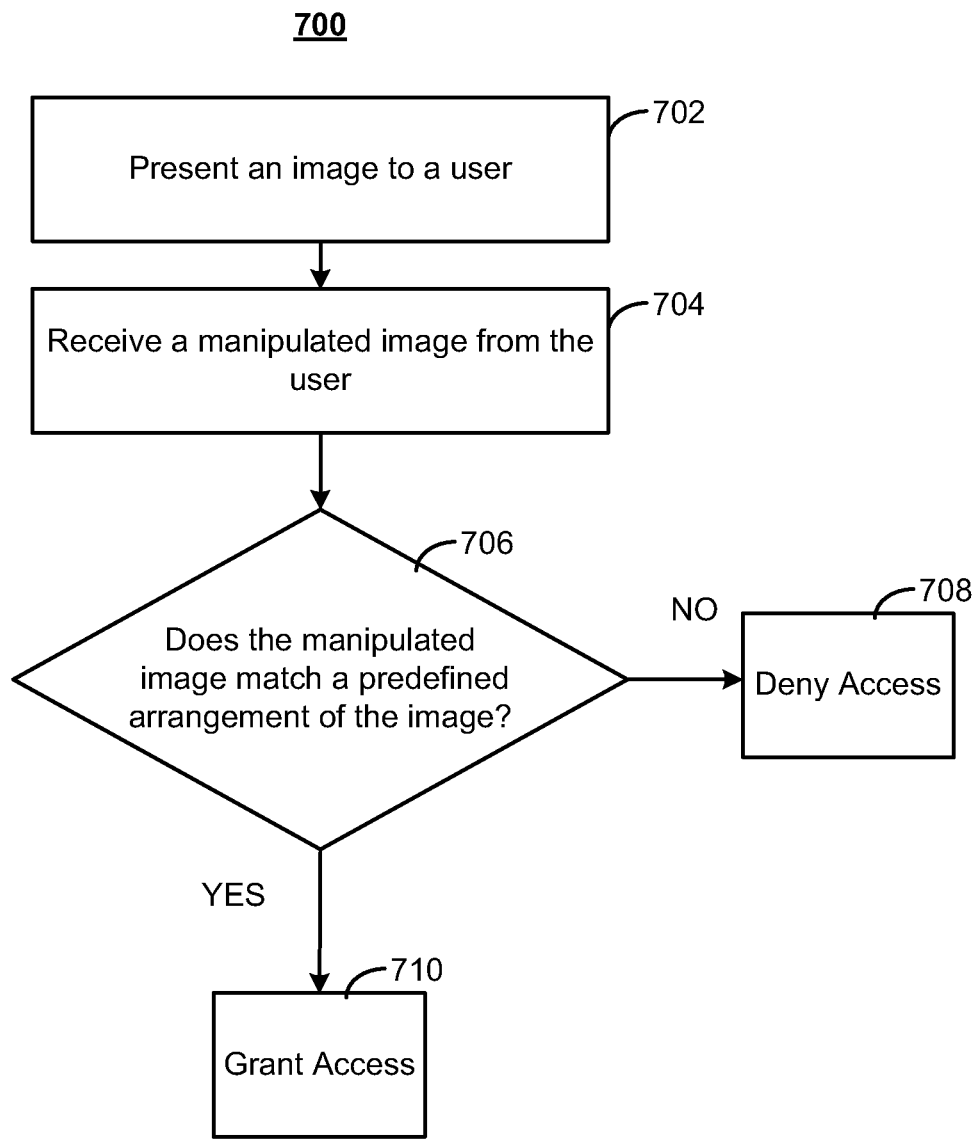

ACCESS USING IMAGE-BASED MANIPULATION

CROSS REFERENCE TO RELATED APPLICATIONS

This application is a continuation-in-part of U.S. patent application Ser. No. 12/254,325, filed on Oct. 20, 2008, entitled "Access Using Image-Based Manipulation," which is hereby incorporated by reference in its entirety.

TECHNICAL FIELD

This document relates to systems and techniques for providing access to computing resources based on user manipulations of images.

BACKGROUND

Computer security is becoming an ever more important feature of computing systems. As users take their computers with them in the form of laptops, palmtops, and smart phones, it becomes desirable to lock such mobile computers from access by third parties. Also, as more computing resources on servers are made available over the Internet, and thus theoretically available to anyone, it becomes more important to ensure that only legitimate users, and not hackers or other fraudsters, are using the resources.

Computer security is commonly provided by requiring a user to submit credentials in the form of a password or pass code. For example, a mobile device may lock after a set number of minutes of inactivity, and may require a user to type a password that is known only to them in order to gain access to the services on the device (or may provide access to limited services without a password). In a similar manner, a web site may require a user to enter a password before being granted access. Also, certain web sites may require potential users to enter a term that is displayed to the users in an obscured manner so that automated machines cannot access the web sites for proper or improper purposes (e.g., to overload the web site servers). Such techniques may be commonly referenced as CAPTCHA's (Completely Automated Public Turing test to tell Computers and Humans Apart).

SUMMARY

This document describes systems and techniques that may be used to limit access to computing services, which, throughout this document, includes computing devices and computing services (e.g., online computing services). In general, images are shown to a user, and the user is required to rotate the images into a proper orientation to gain access. For example, the proper orientation might be one in which most users would agree that the image is rightside-up. Such an example, could be used in a CAPTCHA system to block access by automated computing systems, but permit access by human users. Multiple images also may be displayed to increase the level of security (because it is much harder to match three instances by guessing than it is to match one). Also, the images may be pre-screened so that only images that are very difficult for a computing system to automatically orient are selected. In addition to rotating the images into a proper orientation to gain access, the user also may be required to enter a password to gain access. For instance, the user may be requested to enter the name of the picture in addition to rotating the image into the proper orientation to gain access. In one exemplary implementation, the system and techniques may be used to provide access to electronic devices such as, for example, music devices, game devices, and other types of electronic devices.

Also, the "proper" orientation for an image or images can be set by a user in a secret manner so as to create a pass code. For example, the user may initially be shown a number of images, and may tilt them at odd angles (e.g., not exactly rightside-up) in a manner that they are likely to remember. The approximate angle may also be shown numerically to the user (e.g., as a integer between 0 and 35, or 0 and 17). The user's device may later display the images in other orientations, and the user may rotate them into the appropriate orientations to provide a form of pass code.

In addition, certain images can be presented to users in a manner that the users believe they need to orient the images properly in order to access a computing service. In reality, the system presenting the images may not know the proper orientation of such images, and may use the orientation provided by the user, along with orientations provided by other users to whom the images are displayed, to determine a proper orientation (e.g., if greater than 90% of all user select the same orientation, that orientation will be assumed to be the proper orientation).

In certain implementations, such systems and techniques may provide one or more advantages. For example, image-based orientation can provide for a number of different inputs (e.g., 36 different values per image) so as to provide relatively high security, while permitting a user to enter a pass code with the use of a keyboard. Such an approach may be particularly useful for touch screen devices such as mobile smart phones, where a keyboard is hidden during normal use of the device. Also, image-based rotation may provide a more pleasing interface for users of computing devices, so that the users are more likely to use or remember a device or service. In addition, the images may be customized, either for the user or for a service provider. In such a manner, a user can have images of his or her children for pass codes, and a service provider can use branded images to help reinforce their marketing message with users of a service. In these manners, users may benefit by receiving a more pleasing and easier to use interface, and service providers may benefit by generating additional consumer interest in their offerings. In one exemplary implementation, the images may be customized for advertising purposes such that, in one example, the images represent items being offered for sale.

In one exemplary implementation, the images may be three dimensional (3D) models that may be presented to the user for the user to place the model in its upright position to gain access. In one implementation, the user can rotate the 3D model in a single rotational plane (e.g., over the top) to place the model in its upright position. In another implementation, the user can rotate the 3D model in multiple rotational planes to place the model in its upright position, thus making it even more difficult for access by an automated computing systems as opposed to human beings.

This document also describes that an image may be shown to a user and the user may be asked to manipulate the image to match a predefined arrangement of the image. Access may be provided to a computing service based on a comparison of the manipulated image to the predefined arrangement of the image. For example, the user may arrange the image in a certain configuration or arrangement and that predefined arrangement may be stored in a memory of a computer. When the user attempts to gain access to a computing service, the image may be presented to the user and the user may be asked to manipulate the image to match the predefined arrangement. The user may manipulate the image and submit the manipulated image, where the manipulated image is compared against the predefined arrangement of the image. If the manipulated image that is input by the user matches the predefined arrangement of the image, then the user is granted access to the computing service.

In one exemplary implementation, the image that is presented to the user may be a figure. For example, the figure may be a stick figure, a figure of a person having limbs and/or facial features, a figure of an animal, a geometric shape, puzzle or other type of figure. The user may manipulate the figure to match a predefined arrangement of the figure to gain access to a computing service. For instance, the user may predefine an arrangement of the limbs of the figure, which is stored in memory. When the user attempts to gain access to a computing service, the figure is presented to the user and the user has to manipulate the limbs of the figure to match the predefined arrangement of the limbs. The user submits the manipulated figure and the manipulated figure is compared against the predefined arrangement. If there is a match, then access is granted. If there is not a match, then access is not granted. In this manner, the user can use the arrangement of the figure as a type of pass code such that only the matching arrangement of the figure enables access to be granted.

According to one general aspect, a computer-implemented method may include presenting to a user one or more images, receiving a rotational reorientation of the one or more images by the user and providing access to a computing service based on a comparison of the orientations of the one or more images after reorientation by the user to a standard for each image.

Implementations may include one or more of the following features. For example, the one or more images may be presented to the user inside cropped image circles. The standard for each image may be determined by presenting the image to a plurality of independent users, and the standard may be set to correspond to an orientation identified by the users. In one exemplary implementation, the standard for each image may be determined by presenting the image to multiple independent users in an online game, and the standard may be set to correspond to an orientation identified by the users in the online game.

Access to the computing service may be provided if the orientations of the one or more images are within a predetermined angle of the standard. Providing access to the computer service may include providing access to the computer service based on a comparison of the orientations of the one or more images after reorientation by the user to a preset orientation set by the user for each image.

The computer-implemented method may further include requesting one or more passwords from the user, where the requested passwords correspond to names of the one or more images and receiving the passwords from the user, where access to the computing service based on the comparison of the orientations of the images after reorientation by the user to the standard for each image and based on a comparison of the passwords to a stored name for each of the images.

The computer-implemented method may further include identifying the one or more images by analyzing a group of images to identify images that are very hard for computers to orient automatically. Presenting to the user one or more images may include presenting a plurality of images in a row and providing access to the computing service if each of the images properly compares to a rotational orientation standard.

In one exemplary implementation, presenting to the user one or more images may include presenting to the user one or more three dimensional images, receiving the rotational reorientation may include receiving the rotational reorientation of the one or more three dimensional images and providing access to the computing service may include providing access to the computing service based on a comparison of the orientations of the one or more three dimensional images after reorientation by the user to the standard for each image.

In another exemplary implementation, presenting to the user one or more images may include presenting one or more branded images and providing access to the computing service if each of the branded images properly compares to a rotational orientation standard.

The rotational reorientation may be received by a user dragging the one or more images on a touch screen interface.

The computer-implemented method may further include presenting to the user a supplemental image, in addition to the one or more images, and using the user's reorientation of the supplemental image to determine an orientation standard for the supplemental image.

Providing access to the computing service may include unlocking a mobile computing device and/or serving to the user a web page. The one or more images may be presented to be freely rotated through 360 degrees by the user. The one or more images may lack marks indicating a proper orientation for the images.

In another general aspect, a recordable storage medium having recorded and stored thereon instructions that, when executed, may perform the actions of presenting to a user one or more images, receiving a rotational reorientation of the one or more images by the user and providing access to a computing service based on a comparison of the orientations of the one or more images after reorientation by the user to a standard for each image. Implementations may include one or more of the features described above and below.

In another general aspect, a computer-implemented access control system, may include a graphical user interface programmed to display one or more rotatable images to a user, memory storing one or more standard orientations for the one or more images and a processor programmed to compare orientations of the one or more images input by the user to the one or more standard orientations, and to initiate access by the user to a computing service. Implementations may include one or more of the features described above and below.

In another general aspect, a computer-implemented access control system, may include a graphical user interface programmed to display one or more rotatable images to a user, memory storing one or more standard orientations for the one or more images and means for granting access to one or more computing services based on the user rotation input. Implementations may include one or more of the features described above and below.

In another general aspect, a computer implemented method may include presenting to a user one or more images, receiving a rotational reorientation of the one or more images by the user, and providing access to an electronic device based on a comparison of the orientations of the one or more images after reorientation by the user to a standard for each image.

Implementations may include one or more of the following features. For example, access to the electronic device may be provided if the orientations of the one or more images are within a predetermined angle of the standard. Providing access to the electronic device may include unlocking a music device and/or unlocking a game device.

In one general aspect, a computer-implemented method may include presenting to a user an image, receiving a manipulated image by the user and providing access to a computing service based on a comparison of the manipulated image to a predefined arrangement of the image.

Implementations may include one or more of the following features. For example, presenting to the user the image may include presenting to the user a figure, receiving the manipulated image may include receiving a manipulated figure by the user and providing access to the computing service may include providing access to the computing service based on a comparison of the manipulated figure to a predefined arrangement of the figure. Receiving the manipulated figure may include receiving manipulated facial features of the figure and providing access to the computing service may include providing access to the computing service based on a comparison of the manipulated facial features of the figure to a predefined facial feature arrangement of the figure. Receiving the manipulated figure may include receiving manipulated limbs of the figure and providing access to the computing service may include providing access to the computing service based on a comparison of the manipulated limbs of the figure to a predefined limb arrangement of the figure.

In one exemplary implementation, presenting to the user the figure may include presenting to the user a three dimensional figure, receiving the manipulated figure may include receiving a manipulated three dimensional figure by the user and providing access may include providing access to the computing service based on a comparison of the manipulated three dimensional figure to a predefined arrangement of the three dimensional figure.

The manipulated figure may be received by a user manipulating the figure on a touch screen interface. Providing access to the computing service may include unlocking a mobile computing device. Providing access to the computing service may include serving to the user a web page.

In another general aspect, a recordable storage medium having recorded and stored thereon instructions that, when executed, perform the actions of presenting to a user an image, receiving a manipulated image by the user and providing access to a computing service based on a comparison of the manipulated image to a predefined arrangement of the image.

Implementations may include one or more of the following features. For example, the instructions that, when executed, perform the action of presenting to the user the image may include instructions that, when executed, perform the action of presenting to the user a figure, instructions that, when executed, perform the action of receiving the manipulated image may include instructions that, when executed, perform the action of receiving a manipulated figure by the user and instructions that, when executed, perform the action of providing access to the computing service may include instructions that, when executed, perform the action of providing access to the computing service based on a comparison of the manipulated figure to a predefined arrangement of the figure. The instructions that, when executed, perform the action of receiving the manipulated figure may include instructions that, when executed, perform the action of receiving manipulated facial features of the figure and instructions that, when executed, perform the action of providing access to the computing service may include instructions that, when executed, perform the action of providing access to the computing service based on a comparison of the manipulated facial features of the figure to a predefined facial feature arrangement of the figure.

The instructions that, when executed, perform the action of receiving the manipulated figure may include instructions that, when executed, perform the action of receiving manipulated limbs of the figure and the instructions that, when executed, perform the action of providing access to the computing service may include instructions that, when executed, perform the action of providing access to the computing service based on a comparison of the manipulated limbs of the figure to a predefined limb arrangement of the figure.

In one exemplary implementation, the instructions that, when executed, perform the action of presenting to the user the figure may include instructions that, when executed, perform the action of presenting to the user a three dimensional figure, the instructions that, when executed, perform the action of receiving the manipulated figure may include instructions that, when executed, perform the action of receiving a manipulated three dimensional figure by the user and the instructions that, when executed, perform the action of providing access may include instructions that, when executed, perform the action of providing access to the computing service based on a comparison of the manipulated three dimensional figure to a predefined arrangement of the three dimensional figure. The manipulated figure may be received by a user manipulating the figure on a touch screen interface.

The instructions that, when executed, perform the action of providing access to the computing service may include instructions that, when executed, perform the action of unlocking a mobile computing device. The instructions that, when executed, perform the action of providing access to the computing service may include instructions that, when executed, perform the action of serving to the user a web page.

In another general aspect, a computer-implemented access control system, may include a graphical user interface programmed to display an image to a user, memory storing a predefined arrangement of the image and a processor programmed to compare a manipulated image input by the user to the predefined arrangement of the image, and to initiate access by the user to a computing service.

Implementations may include one or more of the following features. For example, the graphical user interface may be programmed to display a figure to the user, the memory may store a predefined arrangement of the figure and the processor may be programmed to compare a manipulated figure input by the user to the predefined arrangement of the figure, and to initiate access by the user to the computing service.

In another general aspect, a computer-implemented method may include presenting to a user an image, receiving a manipulated image by the user and providing access to an electronic device based on a comparison of the manipulated image by the user to a predefined arrangement of the image.

Implementations may include one or more of the following features. For example, presenting to the user the image may include presenting to the user a figure, receiving the manipulated image may include receiving a manipulated figure by the user and providing access to the electronic device may include providing access to the electronic device based on a comparison of the manipulated figure to a predefined arrangement of the figure. Providing access to the electronic device may include unlocking a music device. Providing access to the electronic device may include unlocking a game device.

The details of one or more implementations are set forth in the accompanying drawings and the description below. Other features will be apparent from the description and drawings, and from the claims.

BRIEF DESCRIPTION OF THE DRAWINGS

FIG. 7 is a flowchart of an example process for limiting access to a computing device and/or computing service.

Like reference symbols in the various drawings indicate like elements.

DETAILED DESCRIPTION

This document describes systems and techniques for mediating access to computing service, which throughout this document includes mediating access to computing devices and mediating access to computing services (e.g., online computing services). Such techniques may include displaying one or more images to a user, where the images are rotated in an orientation that is different than a standard orientation, such as rightside-up, or otherwise improperly oriented such as, for example, backward or stretched. The user may then be prompted to rotate or otherwise re-orient the images to their proper orientation. If the user properly orients the images, the user may be provided access to a device or service.

Such techniques also may include displaying an image to the user, where the displayed image is different than a predefined arrangement of the image. The user may then be prompted to manipulate the image to match the predefined arrangement. If the user properly manipulates the image, the user may be provided access to a device or service. In one exemplary implementation, the image may include a figure, where the user is allowed to manipulate the figure. For example, the user may be able to manipulate the limbs of the figure and/or the facial expression of the figure. In this manner, a match of the manipulated figure to a predefined arrangement of the figure provides access to a device or service.

Figure 1A:
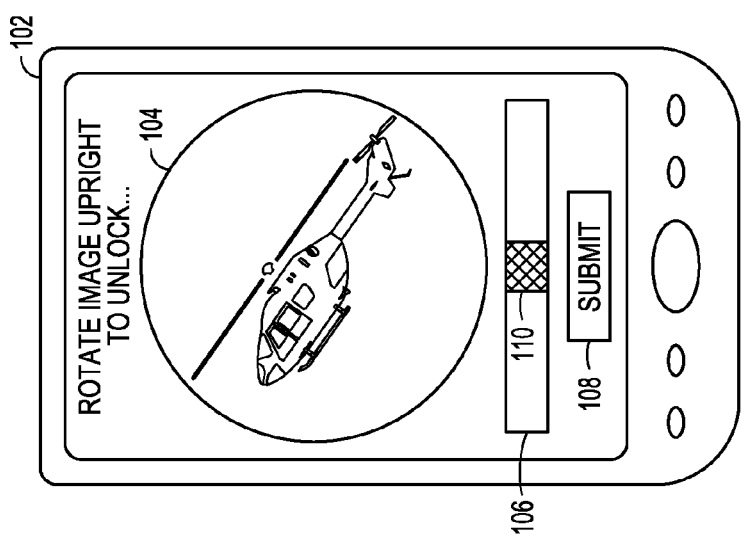
FIG. 1A shows example screen shots of a mobile device presenting a rotatable image pass code.
Figure 1A:
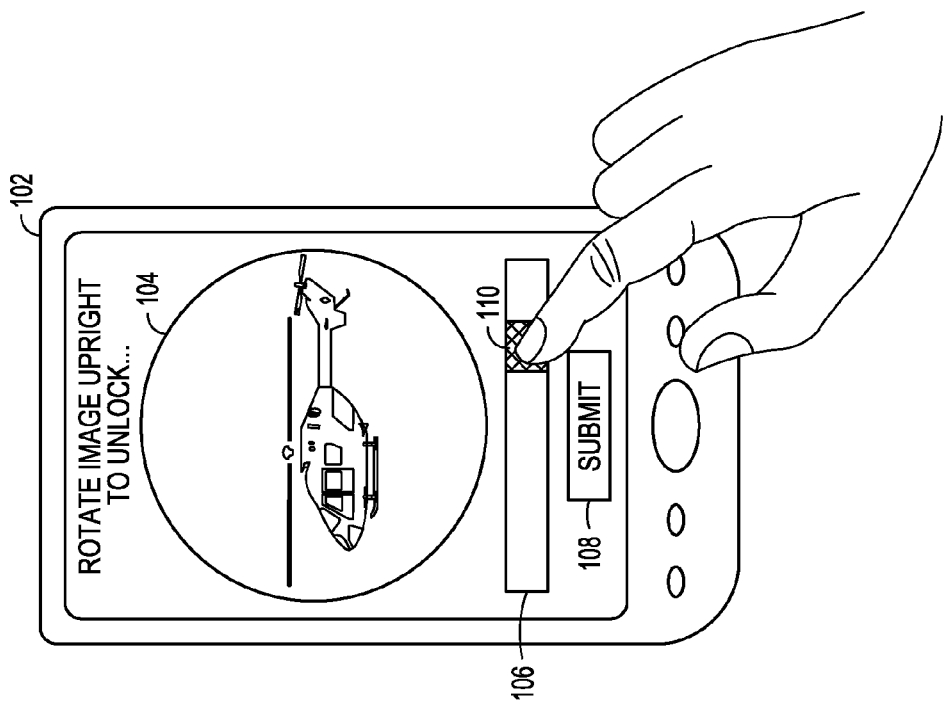

FIG. 1A shows example screen shots of a mobile device presenting a rotatable image pass code. In general, an image is displayed to a user in an other-than appropriate orientation, and the user is asked to orient the image properly in order to unlock the device.

In the figure, two different instances of a displayed image on a device 102 are shown. The left instance shows a mobile device having a touch screen display in portrait mode and displaying an image of a helicopter at an angle that is not the appropriate angle for the image. The image 104 is shown as circumscribed inside a circle so that the shape of the image does not indicate an appropriate orientation for the image 104. Such a circumscribing of the image may have been performed by a central system that provided the image 104 to the device 102.

Several components are displayed on the device 102 to permit appropriate interaction by a user with the image 104. For example, instructions may be provided to the user telling the user that the device 102 can be unlocked by rotating the image to an upright position. Such rotation may be performed by the positioning of a slider control 110 located in a slider bar 106. In an initial position, the slider control 110 is located at the center of the slider bar 106. The slider control 110 may be made active and may be moved by a trackball on the device 102, or by the pressing of keys on the device 102. In one exemplary implementation, the slider control 110 and the slider bar 106 are implemented as part of the touch screen. In certain circumstances, such as for the pressing of keys such as, for example, hard keys or soft keys, each selection of the keys may result in the image 104 rotating a set number of degrees. Similarly, the movement of the slider control 110 may result in the image 104 rotating a set number of degrees. For example, a designer of the application may determine that 36 different orientations for the image 104 are appropriate to provide sufficient security, and yet permit a user to accurately select the position that is upright, without accidentally selecting one of the positions on either side of the upright position.

In the right instance of device 102, a user is shown as having slid the slider control 110 to the right slightly, so as to create a counter clockwise rotation of the image 104. Such sliding may be intuitive to the user and may be performed so that the image 104 rotates in a stepped fashion between rotations that are, for example, 10° apart from each other. When the user has rotated the image 104 to what the user believes is a proper orientation, the user may press a submit button 108 on the device 102. Such selection of the submit button 108 may cause an indicator of the current orientation of image 104 to be provided for testing by device 102. For example, the indicator may be the number plus 20, indicating that the user has rotated the image 20° counter clockwise. Other appropriate indicators for image rotation may also be used, and may be tested in various manners to verify that the rotation of the image 104 matches a standard. The standard may be, for example, an orientation that has been determined by an expert or that has been agreed upon by a large plurality of other users, in manners described in more detail below, such as with respect to FIG. 3A.

In the above example, having the user rotate the images to unlock the device may prevent the user from accidentally hitting buttons (e.g., when the device is in the user's pocket). In another exemplary implementation, the user may be request to enter a password in addition to rotating the images to their proper orientation. For instance, in FIG. 1A, the user may be requested to enter a name of the image 104 in addition to rotating the image to its proper upright orientation. If the user enters the correct name, in this case "helicopter", and rotates the image 104 to its upright position, then access is provided to the device 102. This type of implementation may be used to thwart remote hacking attempts on the device 102. After an incorrect attempt to rotate the image 104 and/or entering an incorrect name of the image, the image may be changed, thus changing the corresponding password along with the image change. This makes it more difficult for remote hackers, especially automated machines, to access the device 102 using guesses and other brute force-type techniques.

In another exemplary implementation, the user may predefine the standard orientation for the image 104. In this example, the user may pre-set the angle for the image 104 and store the pre-set orientation in the device 102. When the user attempts to access the device 102, the image 104 may be randomly rotated to an angle and the user must reorient the image 104 to match the pre-defined orientation. Once the user has rotated the image to match the pre-defined orientation, the user may hit the submit button 108 to compare the reoriented image to the pre-defined standard orientation. A match between the reoriented image and the pre-defined standard orientation results in the user being able to access the device 102. Although a different image 104 may be presented to the user upon an attempt to access the device, the orientation that the images needs to be rotated to may be the same to match the standard orientation as pre-defined by the user. The images presented to the user may be customized for the user such as, for example, the images may include family pictures or other pictures taken or uploaded by the user.

Figure 1B:
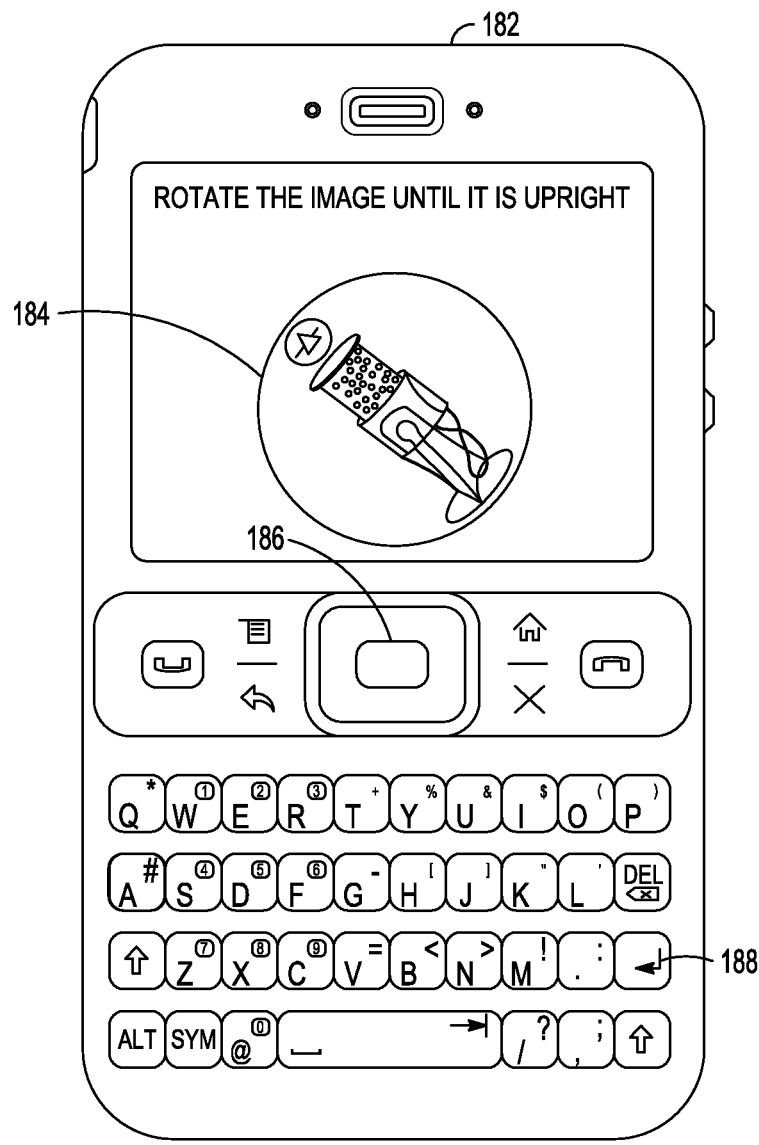
FIG. 1B shows an example screen shot of a mobile device presenting a rotatable image pass code.

FIG. 1B shows an example screen shot of a mobile device 182 presenting a rotatable image 184 as a pass code. Similar to FIG. 1A, the image 184 is displayed to a user in an other-than appropriate orientation, and the user is asked to orient the image properly in order to unlock the device 182.

In this exemplary implementation, the mobile device 182 may include a touch screen display. The image 184 is shown as circumscribed inside a circle so that the shape of the image does not indicate an appropriate orientation for the image 184. Instructions may be provided telling the user to rotate the image until it is upright. In this example, the image 184 may be rotated by touching the image 184 and moving in either a clockwise or a counter clockwise position. When the image 184 is reoriented to the upright position, the user may select an enter or submit button, such as button 186 or button 188. The submitted reorientation is compared against a standard and if the submitted reorientation matches the standard, then the user is granted access to the device 182. If the submitted reorientation does not match the standard, then the user is not granted access to the device 182.

Figure 1C:
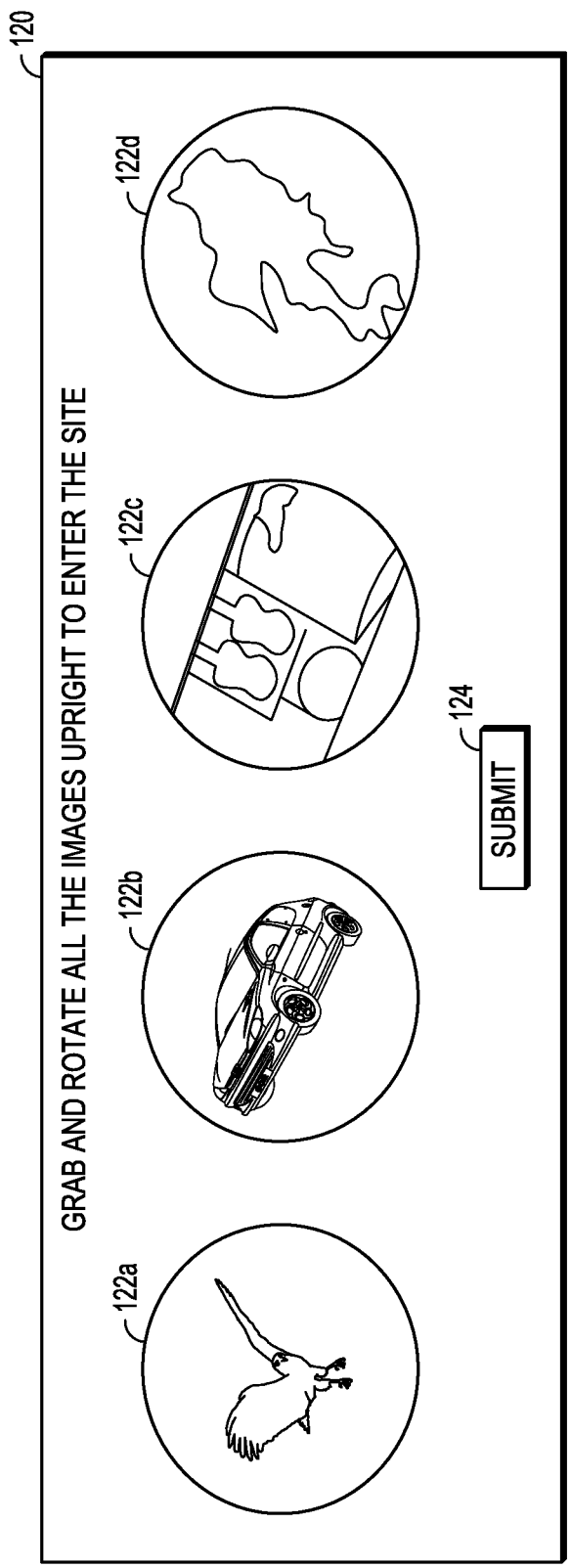
FIG. 1C shows an example screen shot of a rotatable image CAPTCHA application.

FIG. 1C shows an example screen shot of a rotatable image CAPTCHA application. In general, the application is used to separate real human users of a service from automated systems that may attempt to break into a service. For example, the rotatable CAPTCHA application may be used to enable access to a web site or to access a feature or service (e.g., a subscription service) on a web site. The rotatable CAPTCHA application may be used to prevent machines from overwhelming a site or a service such as, for example, a ticket ordering web site. The application also may be used to "learn" the proper orientation of images that are presented to users. For example, the application may present images to users in a game setting such that the users are asked to rotate the images to what they deem to be a proper orientation. If a statistically acceptable number of users rotate the same image to the same orientation, then that orientation may be used as the standard orientation for that image.

In FIG. 1C, a display 120, which may represent a portion or window on a screen of a computing device, shows four different images 122a-122d that are each circumscribed within a circle. The images 122a-122d are each tilted and an angle different from their appropriate angle, but are arranged in a manner so that a user could determine the appropriate angle. Instructions are provided to a user to grab and rotate all of the images so that they are in an upright position so that the user may enter a web site that they are seeking to enter. For example, a first image 122a shows a flamingo against a watery background, a second image 122b shows a sports car, a third image 122c shows a building with a number of curves on it, and a fourth image 122d shows the North American continent in outline form. Once the user has oriented each of the images 122a-122d in a manner that they believe is appropriate, they may press a submit button 124 to have their suggested rotations processed.

The user may re-orient the images 122a-122d in a variety of manners. For example, the display 120 may be a touch screen display, and the user may touch on the surface of any of the images 122a-122d with their finger so as to make the relevant image rotate clockwise or counter clockwise until the image is largely in an upright position. Alternatively, the user may use a keyboard to tab between the images and use keys on a keyboard to rotate the images in set increments, such as at 10° for each keystroke. Also, the display 120 may show a slider control such as slider control 110 in a slider bar 106 from FIG. 1A under each of the images 122a-122d. The user may press and move each of the slider controls to reorient the images appropriately.

In this example, additional images may provide additional security against automated systems that may attempt to guess a rotational angle for one of the images. Each additional image may provide an additional power of alternatives, where three images having 36 different snapped rotational positions may have 36 to the power of three possible combinations. In one exemplary implementation, the user also may be asked to provide a password in addition to rotating the images to the proper orientation. For instance, as discussed above with respect to FIG. 1A, the user may be asked to enter a name of one or more of the images in addition to rotating the image to gain access to the service. When the user selects the submit button 124, the passwords and information regarding the reorientation of the images 122a-122d are submitted for testing against the stored passwords and the standard for each of the images. If the comparison between the submitted information and the standard information results in a match, then the user is granted access to the service. The use of passwords provides an additional layer of security and by using the name of the image, the user is not required to memorize a specific password for accessing the service.

In one exemplary implementation, the user may pre-define the standard orientation for each of the images 122a-122d, as discussed above with respect to FIG. 1A. For example, the user may set each of the images 122a-122d to a particular orientation and that orientation may be stored as the standard orientation. To access the service, the user rotates the images 122a-122d to match the pre-defined orientations and selects the submit button 124 to submit the reoriented images for a comparison to the pre-defined orientations. In one example, the user may set the orientations to correspond to a position of the images such that the pre-defined orientation applies to the position of the image irrespective of the particular image that is displayed. For instance, image 122a may be pre-set at a 10 degree offset from upright, image 122b may be pre-set at a 30 degree offset from upright, image 122c may be pre-set at a 90 degree offset from upright and image 122d may be pre-set at a 45 degree offset from upright. Then, to access the service, the user rotates the presented images, even if they are different images, to the appropriate offset (i.e., 122a at a 10 degree offset, 122b at a 30 degree offset, 122c at a 90 degree offset and 122d at a 45 degree offset).

In addition, one of the images 122a-122d may not be used as part of a pass code for access at all, and made instead be used as a training image. For example, an automatic system may have identified image 122d as a good image to be used in a CAPTCHA process, because the image 122d was difficult for the system to analyze in terms of an appropriate top point for the image. In addition, the top of the original image, which ordinarily would be in the form of a rectangle, might not be the top point identified by most users, such as where the image was taken or photographed at an angle. As a result the image 122d may be presented on display 120 and the rotational angle that is provided by a user may be inferred to be an appropriate rotational angle for the image 122d. That rotational angle may then be used as a standard if the image 122d is later presented to users as an image that is part of a pass code, like the other images 122a-122c.

In addition, the image 122d may normally be presented to a large plurality of users to ensure that the users agree on an appropriate orientation for the image. For example, an image of a guitar may be interpreted by some people as been up right when the neck is pointed vertically upward, whereas others may interpret it as being up right when the neck is pointed at an angel such as the angle that it would take when a person is playing the guitar. In such situations, presentation of the image to multiple users may be helpful in determining the appropriate angle. In doing so, a system may be programmed to show the image to a minimum number of users before registering a standard orientation for the image, and may also perform statistical analyses to ensure that, even when the image has been shown to enough users, the answers or orientations provided by the users agree sufficiently that the system may assume that future users will understand the proper rotation foreign image. For example, if 10 users in a row provide the same orientation for an image, or eight of the users provide one orientation and each of the other users provide an orientation that is one snapped position on each side of the first orientation, the system may assume that the first orientation is the appropriate standard orientation for the image. In contrast, if the 10 users provide orientations that are scattered across a range of orientations, the system may disqualify an image as being too ambiguous with respect to orientation in order to be used as a test image. Alternatively, if all of the user's provide one of two different orientations, such as in the example of a guitar, both such orientations may be set as standards for that image.

In one exemplary implementation, the images 122a-122d may be presented to multiple users in a game setting so that a standard orientation may be determined for the images. For example, the image 122d may be displayed to two independent users in an online CAPTCHA game setting. The users may be asked to rotate the image to an upright orientation. If both users rotate the image to the same position, then that orientation may be used as the standard orientation. The image may be shown to multiple groups of users in the online game setting to determine a standard orientation for the image.

In one exemplary implementation, the images 122a-122d may be branded images to identify a source of the of images and/or to identify a source of the service to which access is being sought. In another exemplary implementation, the images 122a-122d may be used as advertising images. For instance, an online auction site or an online store may use one or more images of items that are being offered for auction or for sale as the case may be. In a similar manner, the images 122a-122d may be used as ad space such that an online service may sell the ad space for the opportunity to display advertisements for a business or other organization.

In one exemplary implementation, the images 122a-122d may be represented as three dimensional (3D) models. The 3D models may be presented to the user in random or pre-programmed orientations and the user may be asked to reorient the 3D models to a standard to gain access to a device or a service. In one exemplary implementation, the 3D models may be generated and the user may manipulate the models using software such as, for example, a FLASH plug-in or the like. For instance, the 3D models may be presented to the user using a FLASH plug-in and the user may manipulate the 3D models using the FLASH plug-in to reorient the 3D models to a proper orientation. The user may select a submit button to cause a comparison of the reoriented models with a standard. If the reoriented models match the standard, then the user is granted access.

In another exemplary implementation, a technique other than using a FLASH plug-in or the like may be used to render a 3D model of an object. For example, the techniques may generate a plurality of images of a model in a seamless procession and place those images in a defined location. The techniques may then generate code (e.g., web browser code such as HTML) that produce controls for cycling through the images and also points to the particular images. Thus, the users may interact with 3D models, which are represented as a series of two dimensional figures without having to worry about whether the users will have particular software programs or plug-ins.

In one exemplary implementation, the 3D models may be rotated by the user in a single rotational plane. In other exemplary implementations, the 3D models may be rotated in multiple rotational planes, thus making it more challenging for automated machines to determine the proper orientation, yet remaining relatively simply for a user to place the 3D model in the proper orientation. Additionally, the 3D models may be generated to remove clues such as, for example, lighting effects, background, and the like, which may provide indications to an automated machine to determine the proper orientation.

Figure 2:
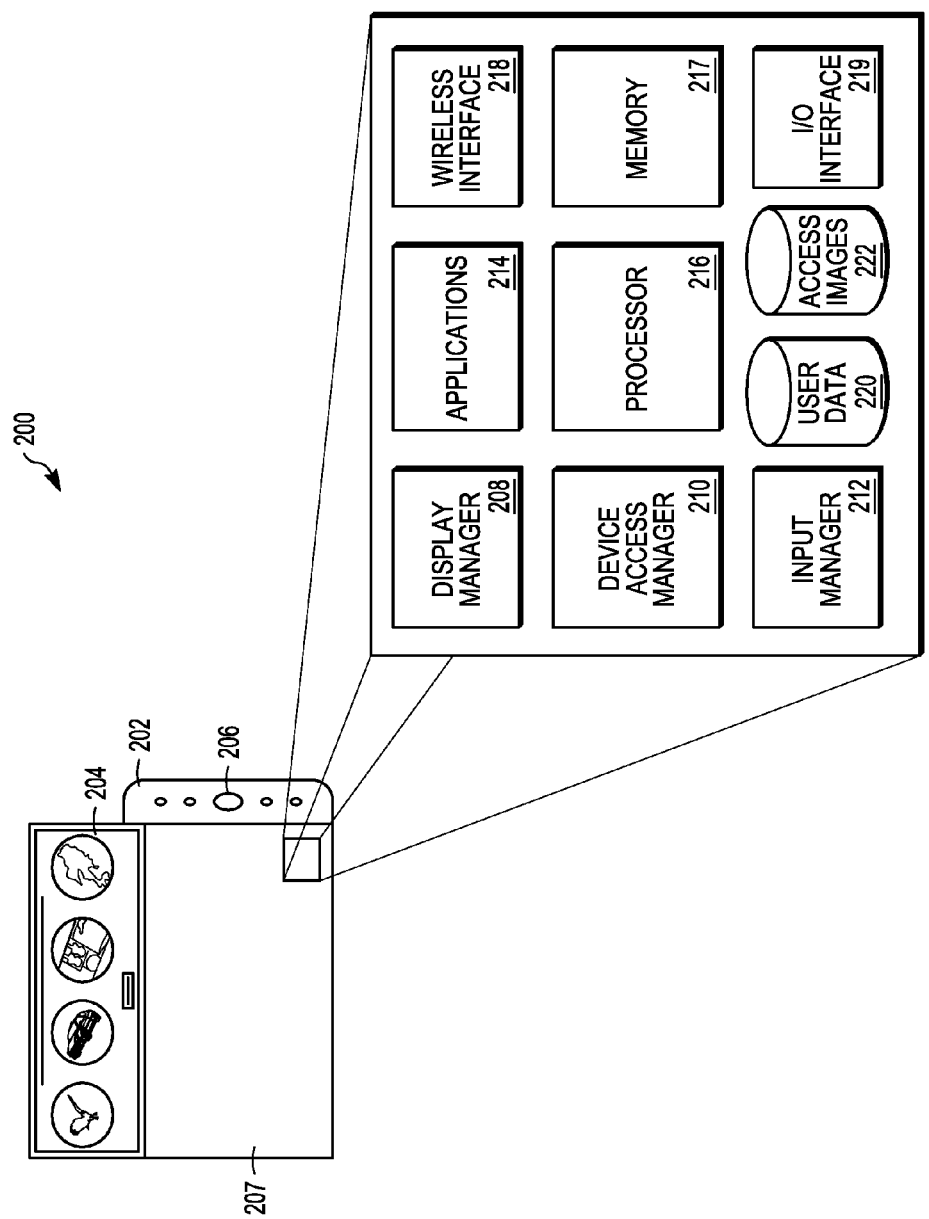
FIG. 2 is an exemplary block diagram of an illustrative mobile system for limiting device access using image inputs from users.

FIG. 2 is an exemplary block diagram of an illustrative mobile system 200 for limiting device access using image inputs from users. The system includes, in the main, a mobile computing device 202, such as, for example, a smart phone or personal digital assistant (PDA), to which access can be granted, or that may mediate access to assets from remote servers or other computers, such as access to Internet web sites access to features and services on Internet web sites.

The device 202 can interact graphically using a graphical user interface (GUI) on a display 204 that may show representations of various images to a user and that may receive input from the user. In one example, the display 204 is a touch screen display, so that a user may directly press upon images to manipulate them on the display 204. Input to the device may also be provided using a trackball 206 and a keyboard 207 on the device 202. The keyboard 207 may be a hard keyboard with physical keys, a soft keyboard that is essentially a touch screen keyboard, or a combination of both.

A display manager 208 is provided to supervise and coordinate information to be shown on the display 204. The display manager 208, for example, may be provided with data relating to information to be displayed and may coordinate data received from various different applications or modules. As one example, display manager 208 may receive data for overlapping windows on a windowed display and may determine which window is to be on top and where the lower window or windows is to be cut.

Device inputs such as presses on the touch screen 204 may be processed by an input manager 212. For example, the input manager 212 may receive information regarding input provided by a user on touch screen 204, and may forward such information to various applications or modules. For example, the input manager 212 may cooperate with the display manager 208 so as to understand what onscreen elements a user is selecting when they press on the touch screen 204.

The device 202 may include a processor 216 that executes instructions stored in memory 217, including instructions provided by a variety of applications 214 stored on the device 202. The processor 216 may comprise multiple processors responsible for coordinating interactions among other device components and communications over an I/O interface 219.

The processor 216 also may be responsible for managing internal alerts generated by the device 202. For example, the processor 216 may be alerted by the input manager 212 (which may operate on the processor) when a user touches the display 204 so as to take the device 202 out of a sleep mode state. Such an input may cause the processor 216 to present images for reorientation by the user in order to provide access to the device 202 or various services, as explained above and below.

The processor 216 may perform such functions in cooperation with a device access manager 210. The device access manager 210 may execute code to gather images from the access images memory 222, to rotate such images by a determined angle, and to present the images to a user of the device 202. The device access manager 210 may display the images in a manner that permits user manipulation of the images (e.g., rotation), may test user inputs on the images, and may provide an indication that access should be granted or denied.

The device also includes memory 220, 222 storing various data. The memory 220, 222 may comprise random access memory where computer instructions and data are stored in a volatile memory device for execution by the processor 216. The memory 220, 222 may also include read-only memory where invariant low-level systems code or data for basic system functions such as basic input and output, and startup instructions reside. In addition, the memory 220, 222 may include other suitable types of memory such as programmable read-only memory, erasable programmable read-only memory, electrically erasable programmable read-only memory, hard disks, and removable memory such as microSD cards or Flash memory.

The memory 220, 222 may, in one example, include user data memory 220, which may story various parameters describing preferences for a user of the device 202. The user data memory 220 may, for example, store and provide ordinary user pass codes, user identifying information (e.g., name, address, telephone numbers, and e-mail addresses), and other such information. Separately or together, access images memory 222 may store images used to access the device 202 or various web pages, along with meta data about the images, such as indicators for the level of orientation that separates the image as stored on the device 202 and the orientation of the image when it is right sideup.

The device 202 may communicate with other devices or a network through a wireless interface 218. The wireless interface 218 may provide for communication by the device 202 with messaging services such as text messaging, e-mail, and telephone voice mail messaging. In addition, the wireless interface 218 may support downloads and uploads of content and computer code over a wireless network. The wireless interface 218 may additionally provide for voice communications in a wireless network in a familiar manner. As one example, the wireless interface 218 may be used to interact with internet web pages that are to be displayed on display 204, and to submit orientation information to a server or servers remote from the device 202.

Figure 3A:
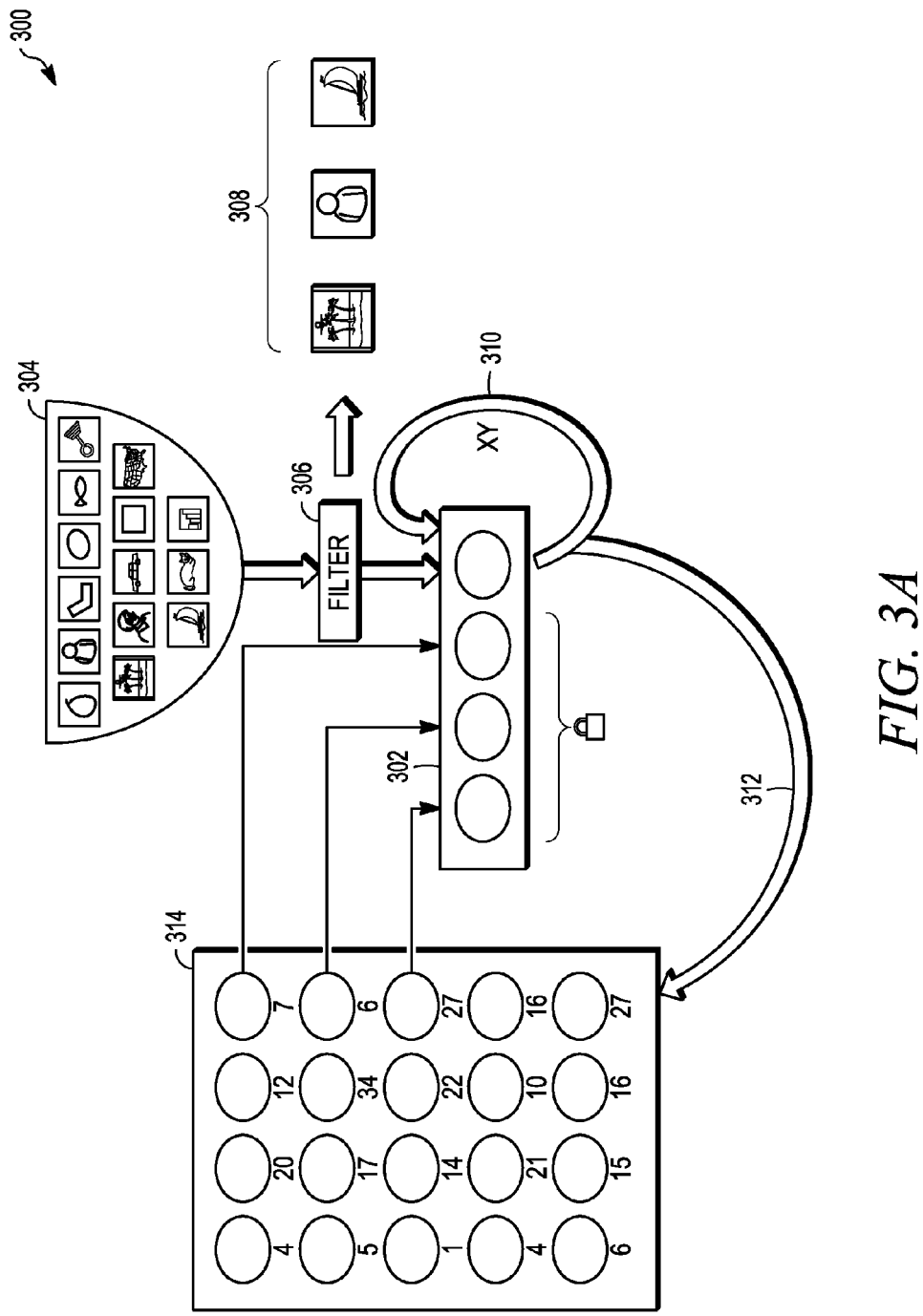
FIG. 3A is an exemplary conceptual diagram showing the gathering and processing of images for use in a CAPTCHA system.

FIG. 3A is a conceptual diagram showing the gathering and processing of images for use in a CAPTCHA system. In general, a conceptual flow 300 is shown as involving the gathering of images to form a corpus 304, the filtering of the images to identify images that can be oriented properly by an automated system (and thus are not suitable for use in a CAPTCHA), and the provision of the filtered images to users to determine proper orientations for the images, so that the images can be later used as CAPTCHA test images.

A corpus 304 may be formed by gathering and storing the images in an image repository. The corpus 304 may include digital images from a service or digital images taken by users and uploaded to the corpus 304 and designated as available for public use. For instance, the corpus 304 may be Picasa Web Albums by Google containing digital images that have been marked for public use.

The images in the corpus 304 may be filtered by through filter 306 to determine which images are easily oriented properly by an automated system and, thus, are not good candidates for use in a CAPTCHA application. The filter 306 may be configured to receive the images and attempt to automatically orient the images to a proper orientation. In one exemplary implementation, the filter 306 may apply face recognition techniques in an attempt to orient images that include facial features. The filter 306 also may be configured to apply techniques to recognize indicators such as the horizon or colors such as blue for the sky to orient an image to the proper orientation. Images 308 are ones that the filter 306 has automatically oriented to the proper orientation. Consequently, those images 308 are not good candidates for use in a CAPTCHA application.

If the filter 306 is not able to properly orient an image, then the image may be displayed to one or more users as a training image in a display 302. As discussed above with respect to FIG. 1C, the image may be displayed as a training image to determine the proper orientation for the image. For example, the digital image that passed the filter 106 may be rotated by a randomly chosen angle, either clockwise or counter clockwise between 0 and 360 degrees. Like the other images in display 302, the training image may be masked, which may include creating a round cut-out of the digital image to hide the borders and edges of the digital image. The users are asked to rotate the image to a proper orientation. An angle by which each user rotates the digital image may be recorded. Then, a correction angle for the proper orientation may be calculated using the random angle and angle recorded from the rotation by the user. This process may be repeated 310 multiple times for each image such that a statistically significant sample is gathered. Once the proper orientation has been determined for the image, then it may be communication 312 to an image repository 314 that contains images to be used in a CAPTCHA application to enable access to a service or to unlock a device.

In one exemplary implementation, when the image is displayed as a training image, the users also may be asked to insert a name for the image. The name for the image entered by each user is recorded. This process may be repeated multiple time for each image such that a statistically significant sample is gathered. Then, the names entered for the image may be analyzed to determine if one or more of the names should be accepted as a password that asks for the name of the image. Once the proper names have been determined for the image, then they may be communicated to the image repository that contains images and their associated names as passwords to be used in a CAPTCHA application to enable access to a service or to unlock a device.

Figure 3B:
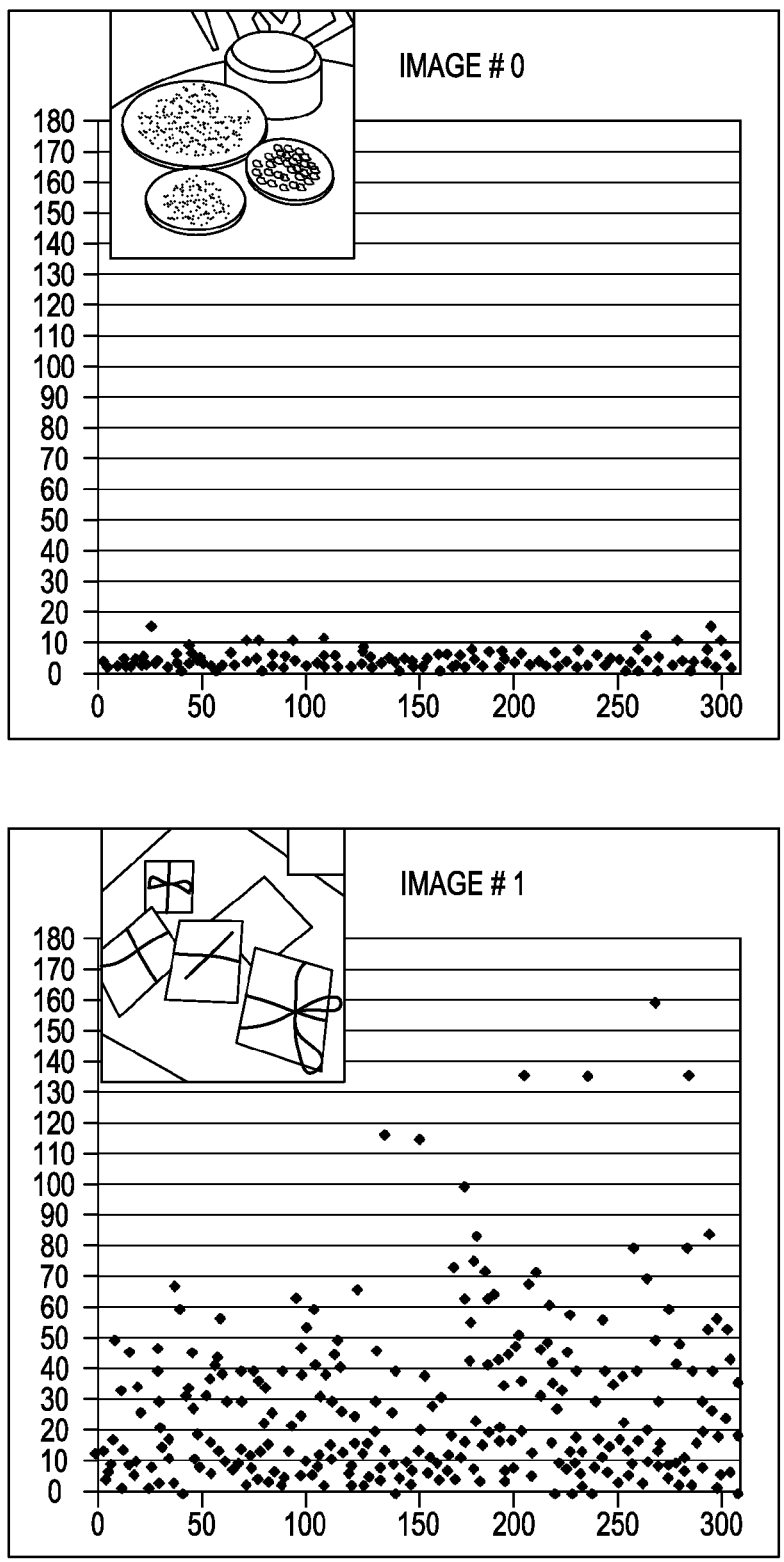
FIG. 3B, which includes 3BA through 3BF, is an exemplary set of graphs illustrating information gathered for potential CAPTCHA images.
Figure 3B:
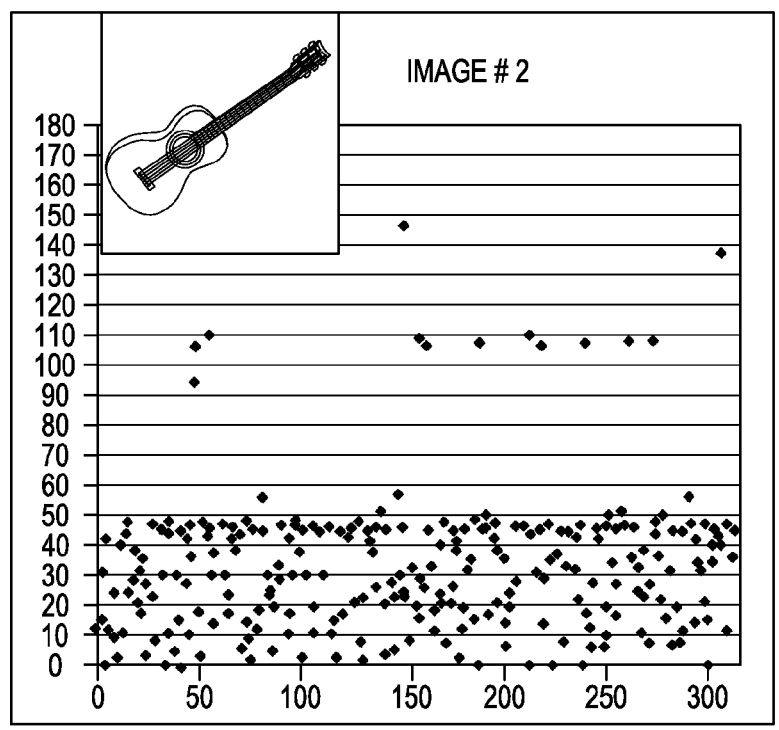
Figure 3B:
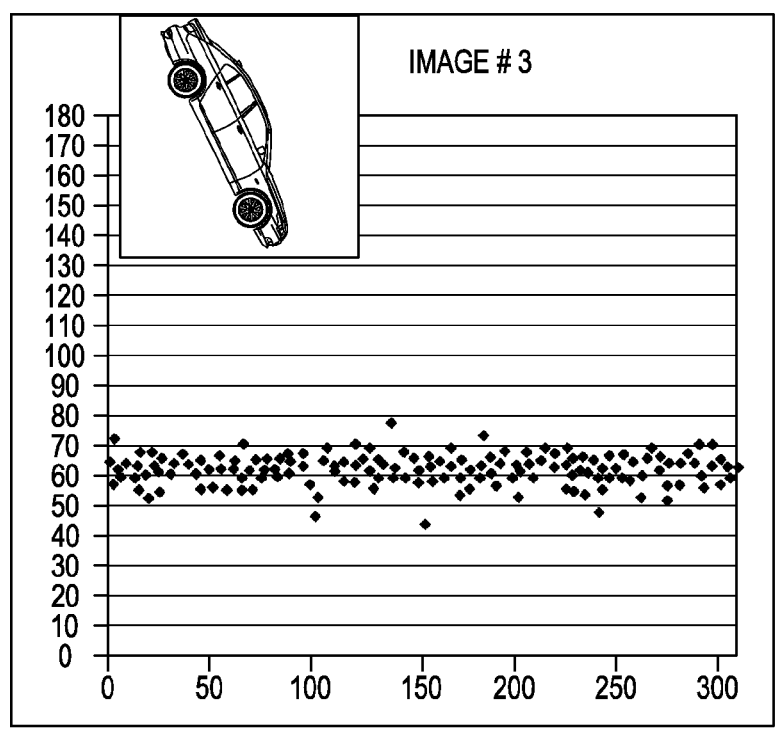
Figure 3B:
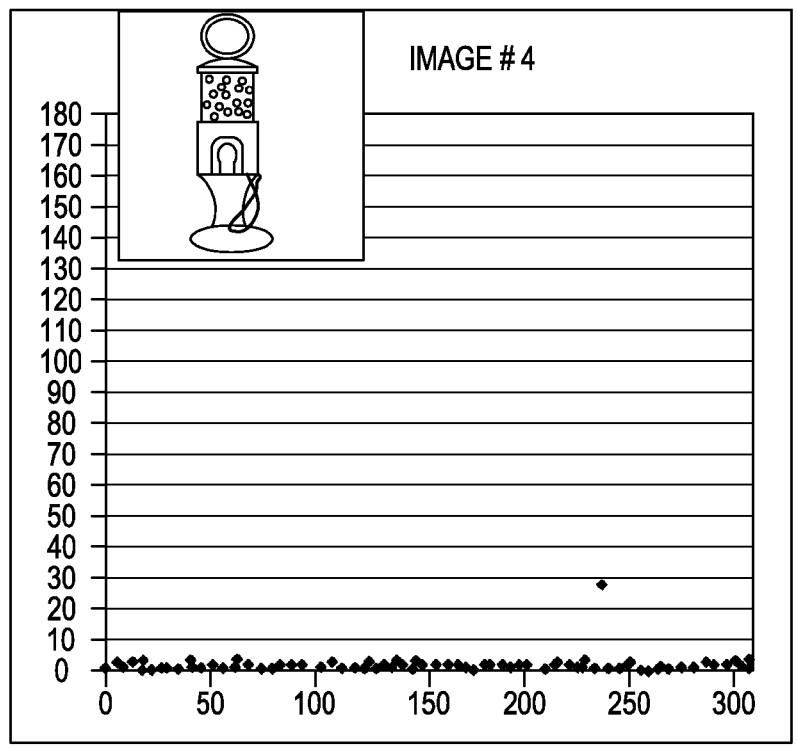
Figure 3B:
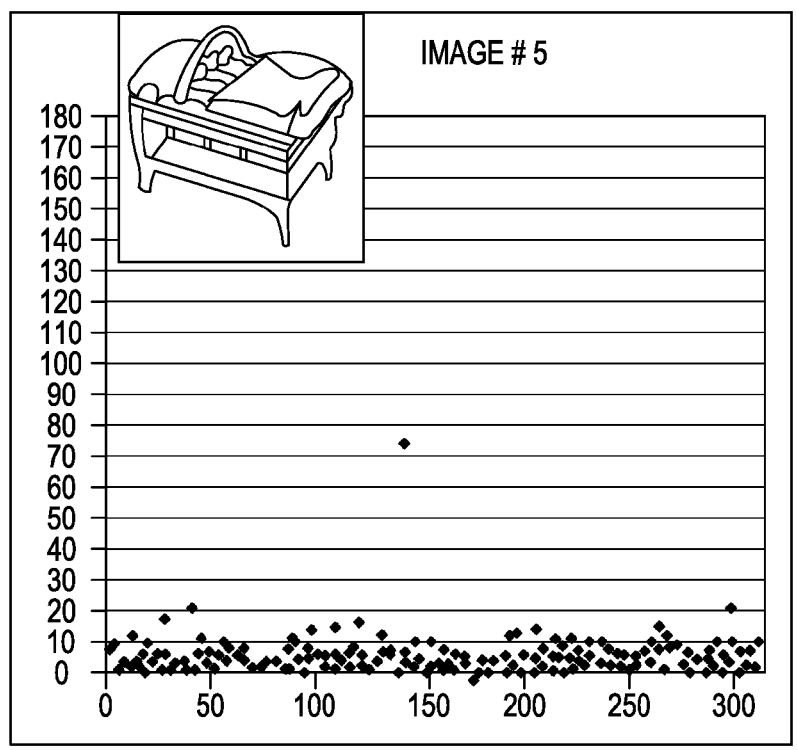
Figure 3B:
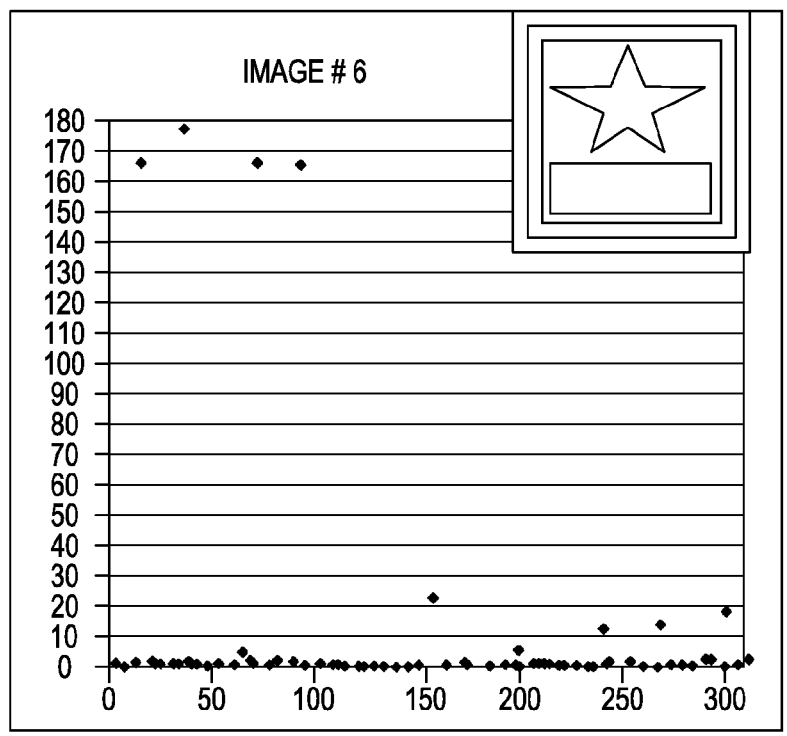
Figure 3B:
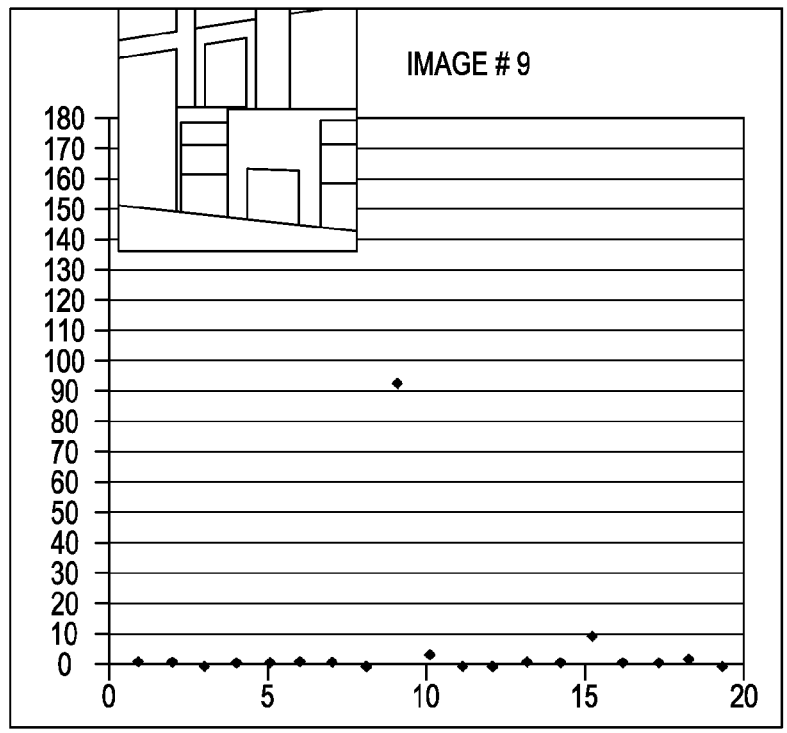
Figure 3B:
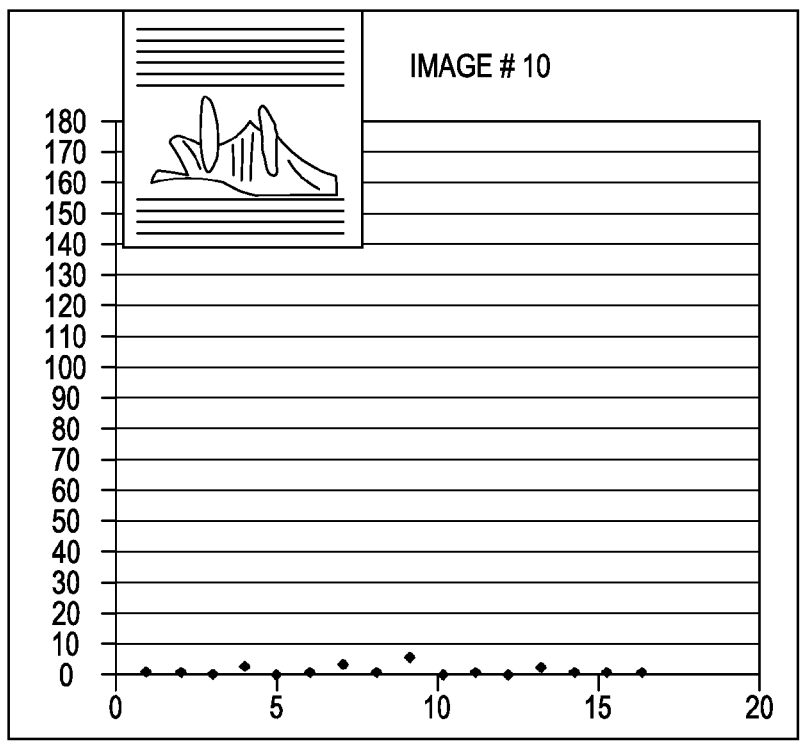
Figure 3B:
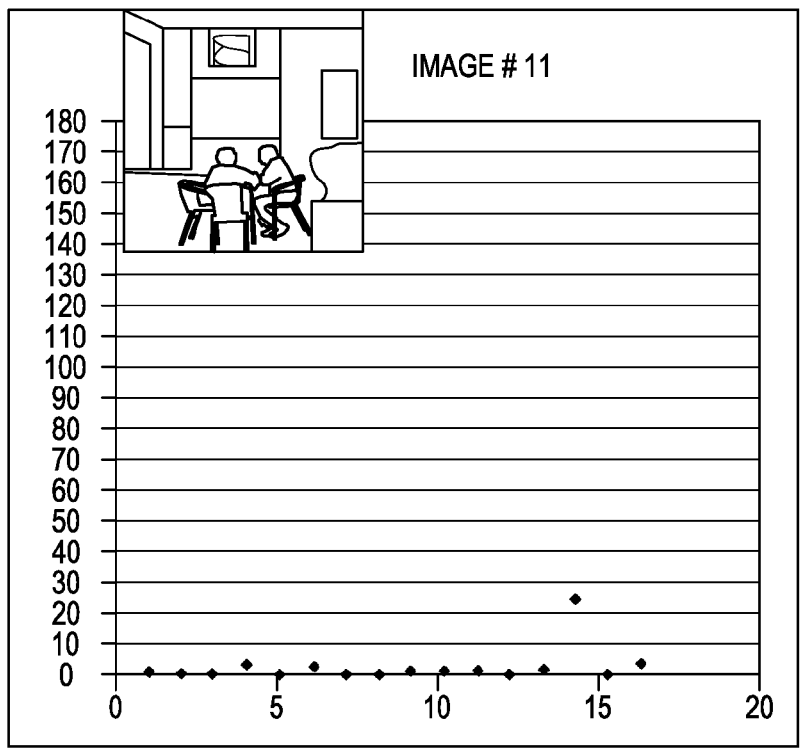
Figure 3B:
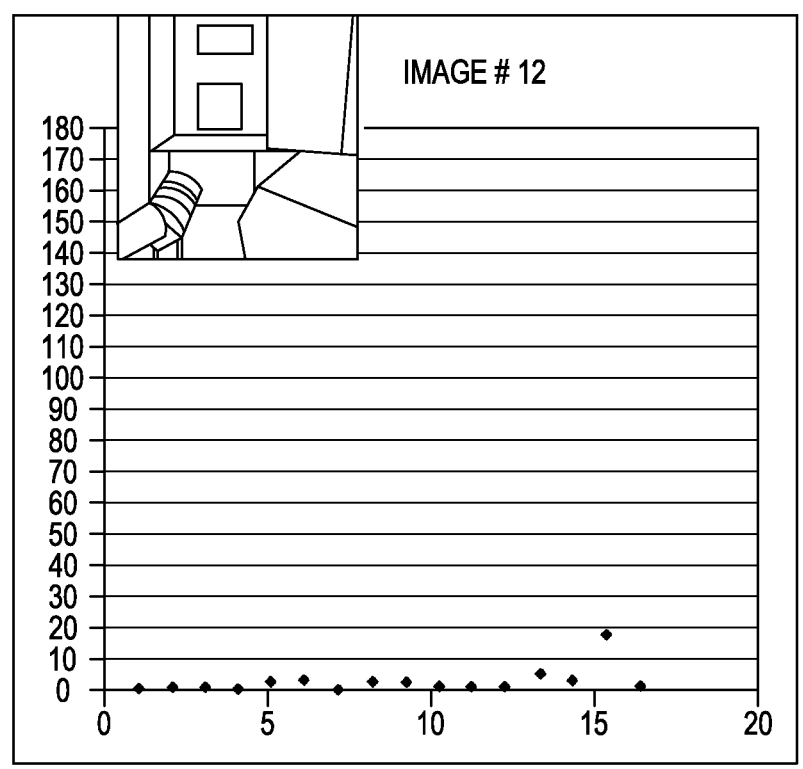

FIG. 3B, which includes 3BA through 3BF, is an exemplary set of graphs illustrating information gathered about potential candidate CAPTCHA images. In general, as discussed above with respect to 3A, potential CAPTCHA images may be displayed to users as a training image. The users may be asked to determine the proper orientation of the image. The reorientation information submitted by users may be gathered, stored and analyzed for statistical significance and to determine whether or not an image should be used in a CAPTCHA application and, if so, how much the image should be corrected for a proper orientation.

The x-axis on the graphs indicates the number of users who have reoriented the image and the y-axis is the amount of degrees the image was rotated by the users. For example, the graph labeled "image#4" provides an illustration of an image that many users rotated to the same upright orientation thus making it a good image to use in a CAPTCHA application. On the other hand, the graph labeled "image#1" provides an illustration of an image where many users varied in the rotation to the upright position thus not making it a good image to use in a CAPTCHA application. The graph labeled "image#3" provides an illustration of an image that many users rotated to the same upright orientation at an offset of sixty degrees. Thus, this image too would be used in a CAPTCHA application.

Different statistical calculations may be used to determine whether an image is a good candidate for use in a CAPTCHA application. For instance, the mean or average for the images may be used and then the standard deviation and variance to determine if the data remains around the mean/average. In some implementations, statistical tests such as, for example, a t-test, may be used to determine if there is a large enough sample of users to make the statistical analysis valid.

Figure 4A:
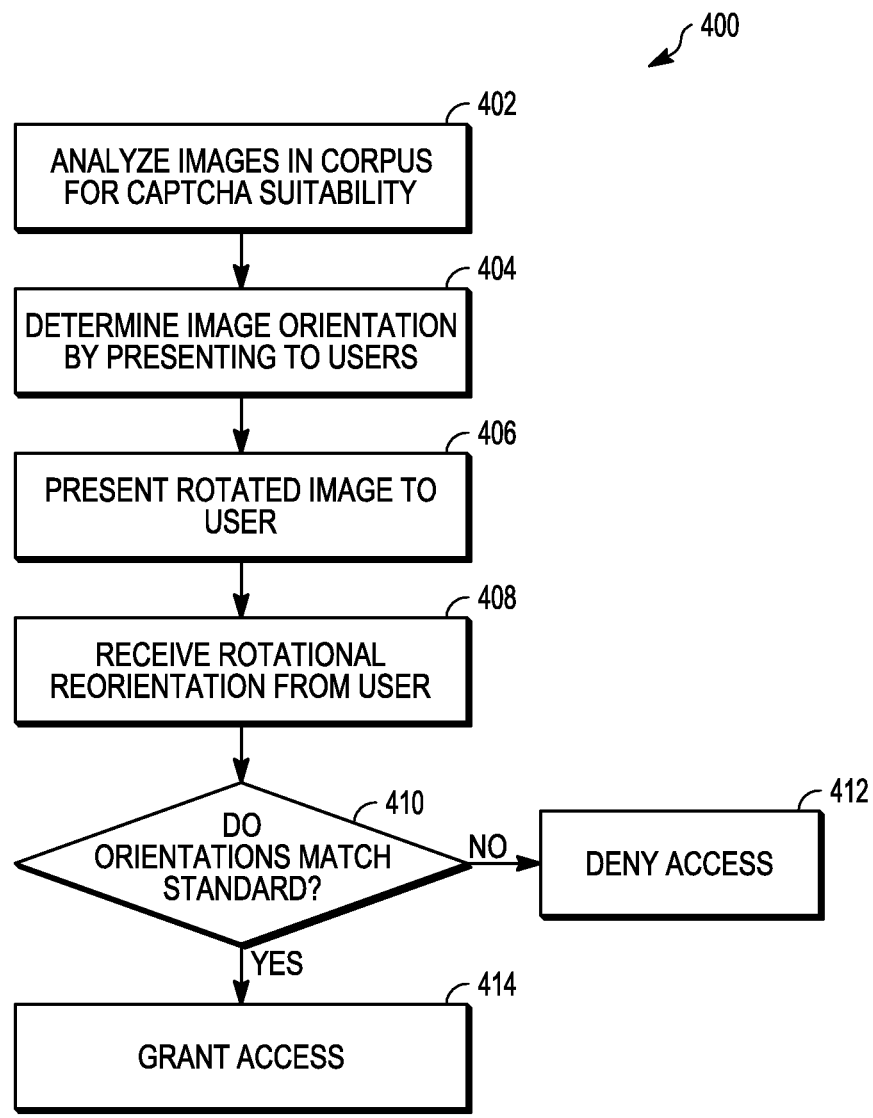
FIG. 4A is a flowchart of an example process for limiting access to a computing device.

FIG. 4A is a flowchart of an example process 400 for limiting access to a computing device. In general, the process 400 involves identifying figures that are useful for an orientation-based CAPTCHA test, and presenting such images to a user to determine whether the user can orient the images properly, and to thus conclude that the user is a human who should be granted access to the computing device.

Process 400 may include analyzing images in corpus for CAPTCHA suitability (402). As discussed above with respect to FIG. 3A, a corpus 304 may first be passed through a filter 306 to determine whether or not an automated machine may determine the proper orientation for the image. If the filter 306 is not able to determine the proper orientation, then the image may be displayed to users as a training image (e.g., either as part of access attempt or in an online game setting), so that it can be determined whether or not humans can generally agree on the proper orientation and, if so, what is the proper orientation (404). Images that are good candidates may be stored in a repository 314 for eventual use in a CAPTCHA application to enable access to a device and/or to a service.

Process 400 also includes presenting a rotated image to the user (406). For example, as discussed above in FIG. 1A, a rotated image 104 may be presented to the user of a device 102. The user is asked to rotate the image 104 to its proper orientation in order to gain access to the device 102. Process 400 includes receiving the rotational reorientation from the user (408). For instance, the user may use the slider control 110 to rotate the image and selecting the submit button 108 to cause the reoriented image to be compared against the standard (410). If the rotational reorientation from the user does not match the standard, then access to the device is denied (412). If the rotational reorientation from the user does match the standard, then access to the device is granted (414). In one exemplary implementation, an exact match of the rotational reorientation from the user to the standard is not necessary to access the device. Instead, access to the device may be granted if the rotational reorientation from the user is within a predetermined angle of the standard.

Figure 4B:
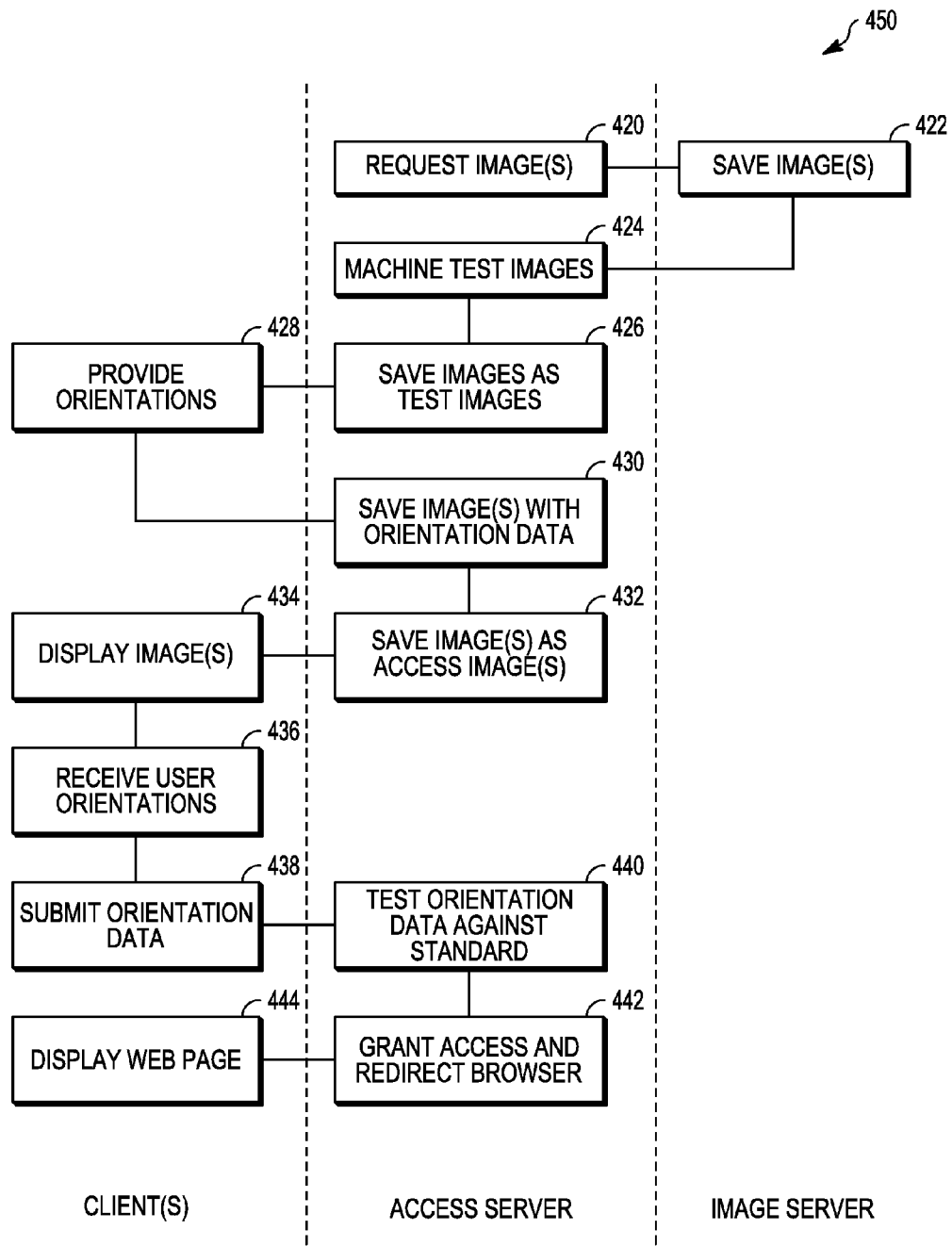
FIG. 4B is a swim lane diagram of an example process for granting user access to a web page.

FIG. 4B is a swim lane diagram of an example process 450 for granting user access to a web page and/or to an online service. An access server may request one or more images from an image server (420). The image server may be configured to retrieve images from an image repository and to serve the images to the requesting access server (422). The access server may machine test the images (424) to determine whether or not the images are good candidates for use in a CAPTCHA application. For example, the filter 306 of FIG. 3A may be used to machine test the images (424). If the images pass the test, meaning that the images are difficult or impossible for a machine to orient to the proper orientation, then the access server may serve the images along with test images to a client (426). The access server may be configured to serve the images to the client in a random and/or predetermined rotated manner at an angle offset from the proper orientation.

Multiple users at multiple clients may be asked to provide orientations for the test images (428). For example, the test images may be displayed as a training image along with other images as discussed above with respect to FIG. 1C and FIG. 3A. The test images may be served and orientations provided by multiple users as part of an online CAPTCHA game in an online game setting. The images and the orientation data provided by the users are then saved (430). Those images may be used a pass code to provide access to a web site and/or a service.

When a user wants to access a web site or a service, the saved images may be served by the access server to the client (432). The images are displayed on the client (434) and the user is asked to reorient the images to gain access. The client receives the user orientations (436) and the orientation data is submitted to the access server (438). Then, the access server tests the orientation data against the standard for each of the images (440). If the orientation data matches the standard or is within a predetermined threshold of the standard, then the access server grants access and may redirect the client browser to a secure portion of the web site or the service (442). The web page(s) corresponding to the secure portion of the web site may be displayed on the client browser (444).

Figure 5:
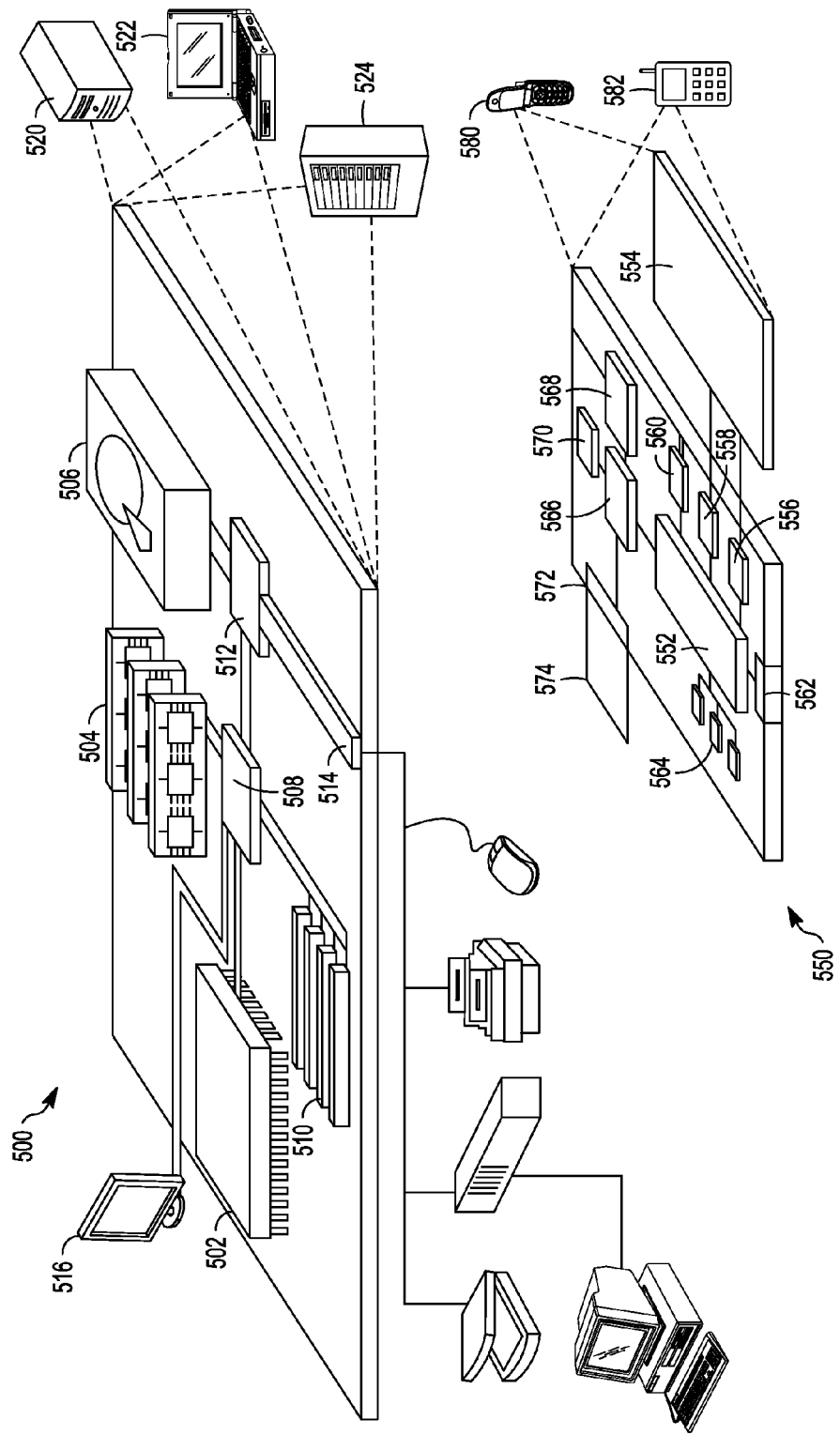
FIG. 5 shows an example of a computer device and a mobile computer device that can be used to implement the techniques described here.

FIG. 5 shows an example of a generic computer device 500 and a generic mobile computer device 550, which may be used with the techniques described here, both above and below. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Figure 6:
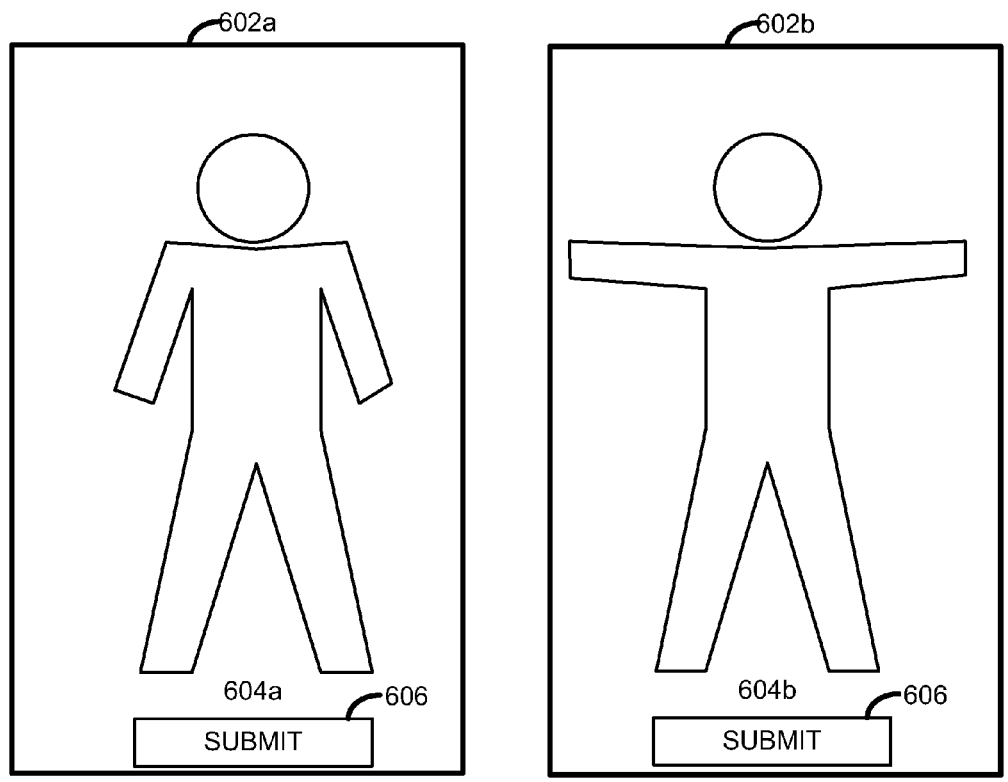
FIG. 6 shows an example screen shot of a display presenting an image to be manipulated by a user.

FIG. 6 shows example screen shots 602a and 602b of a display presenting an image to a user. The screen shots 602a and 602b may be a display from an electronic device such as a mobile device or game or may be a display from any computing device. In general, an image is displayed to a user and the user is asked to manipulate the image to match a predefined arrangement of the image in order to unlock a device or other gain access to a computing service.

In the figure, two different instances of a displayed image 604a and 604b on a display are shown. The left screen shot 602a shows an image of a FIG. 604a, which may be displayed to a user attempting to unlock a device or attempting to gain access to a computing service. The user may or may not be explicitly prompted to manipulate the image of the FIG. 604a. In order to unlock the device or gain access to the computing service, the user manipulates the figure to match a predefined arrangement of the figure. For example, the user may move the limbs of the figure (e.g., the arms or legs) or other features of the figure. In this example, the user manipulates the figure by moving the arms as illustrated in the right screen shot 602b such that the FIG. 604b has the arms in a new arrangement. The user may select the SUBMIT button 606 to cause the manipulated FIG. 604b to be compared against a predefined arrangement of the figure. If the manipulated FIG. 604b matches the predefined arrangement of the figure, then access is granted. If the manipulated FIG. 604b does not match the predefined arrangement of the figure, then access is not granted.

The user may interact with the displayed figures in different ways. For example, as discussed above with respect to FIG. 1A, the user may interact with a touch screen display to touch and move the figure. For instance, the user may touch the right arm of FIG. 604a and drag the arm into the upright position as shown by the image of FIG. 604b. Other features may be used to control manipulating the figure including, for example, a slider control and slider bar, hard keys, soft keys, a mouse and other features, as described in more detail above.

In one exemplary implementation, the features of the figures 604a may be configured to be manipulated in varying degrees. For example, each of the limbs may be configured to move in a set number of positions or through a set number of degrees. For instance, each of the limbs may be manipulated in 20 different positions to provide sufficient security, and yet permit a user to accurately select the positions that match the predetermined arrangement of the figure.

The user may set the predetermined arrangement of the figure. For example, the user may set the position of the limbs to a desired position and save the arrangement of the limbs as the predefined arrangement. The predefined arrangement may be saved in the memory of a device and/or in the memory of a server related to a computing service. When the user attempts to access the device or computing service, the figure is presented to the user, either in a random arrangement or in a standard arrangement. As discussed above, the user then manipulates the figure to match the predetermined arrangement of the figure that was previously set by the user.

For added security, the user may predefine multiple different figures and may be asked to manipulate one or more presented figures to match the predefined arrangements. For instance, the user may predefine an arrangement of a male figure and a female figure. The predefined arrangements may be different for each figure. When the user attempts to access a device or a computing service, either or both of the figures may be presented to the user for the user to manipulate to match the predefined arrangement of the figures.

Also for added security, and as discussed above, passwords and other security features may be used in combination with the manipulation of the images to gain access to a device or to a computing service.

The figures provided in these examples are merely figures to illustrate the concept. As will be understood by one skilled in the art, a more detailed figure may be displayed to the user showing more features, which may be manipulated to match a predefined arrangement in order to gain access to a device or a computing service. For example, a more detailed figure may include hands, fingers, feet, toes, and facial features, all of which may be manipulated by the user. Facial features that may be manipulated may include eyes (e.g., open or closed, or one eye open and one eye closed), mouth expression, eyebrows, nose and other facial features.

In other exemplary implementations, other types of images may be presented to the user to manipulate and gain access. For example, images of animals may be used, where the user may predefine an arrangement of the features for a particular animal. The image of the animal is later presented to the user and the user must manipulate the features of the animal in order to gain access. Still other types of images may be used including puzzles and geometric shapes that may be manipulated by the user to match a predefined arrangement of the puzzle or geometric shape.

In another exemplary implementation, the images presented to the user may be represented as three dimensional (3D) models. The user may predefine an arrangement of the 3D model and the predefined arrangement may be stored in a memory. When the user attempts to access a device or a computing service, the 3D model is presented to the user in random or generic arrangement and the user is asked to manipulate the 3D model to match the predefined arrangement of the model in order to gain access.

Referring to FIG. 7, an exemplary process 700 for controlling access to a device and/or a computing service is illustrated. Process 700 includes presenting an image to a user (702), receiving a manipulated image from the user (704) and determining whether or not the manipulated image matches a predefined arrangement of the image (706). If the manipulated image does not match the predefined arrangement of the image, then access is denied (708). If the manipulated image does match the predefined arrangement of the image, then access is granted (710).

For example, process 700 may be implemented using the device and its components as described above with respect to FIG. 2. Process 700 also may be implemented using an online computer system that is configured to provide access to a user. For example, the image that is presented to the user may be delivered over a network (e.g., the Internet) and the manipulated image may be received at a server that compares a stored version of the predefined arrangement of the image and determines whether or not to grant access to the online computing service.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   presenting to a user an image of a figure having anatomical features, the anatomical features including facial features and limbs;
   enabling the user to manipulate the figure by changing a positioning of at least one anatomical feature within the presented image, wherein the positioning of the anatomical features on the figure corresponds to a password;
   receiving a manipulated image of the figure by the user to at least one of the facial features or at least one of the limbs of the figure, wherein the manipulated image includes a change in the positioning of at least one anatomical feature within the presented image including a change in the positioning of at least one of the facial features or at least one of the limbs of the figure; and
   providing access to a computing service based on a comparison of the manipulated image of the figure to a predefined arrangement of the positioning of the anatomical features including based on a comparison of the manipulated facial features and limbs of the figure to a predefined facial feature and limb arrangement corresponding to the password set by the user.

2. The computer-implemented method of claim 1 wherein:
   presenting to the user the figure comprises presenting to the user a three dimensional figure;
   receiving the manipulated figure comprises receiving a manipulated three dimensional figure by the user, wherein the manipulated three dimensional figure includes a change in the positioning of at least one feature within the presented three dimensional figure; and
   providing access comprises providing access to the computing service based on a comparison of the manipulated three dimensional figure to a predefined arrangement of the three dimensional figure set by the user.

3. The computer-implemented method of claim 1 wherein the manipulated figure is received by a user manipulating the figure on a touch screen interface.

4. The computer-implemented method of claim 1 wherein providing access to the computing service comprises unlocking a mobile computing device.

5. The computer-implemented method of claim 1 wherein providing access to the computing service comprises serving to the user a web page.

6. A non-transitory recordable storage medium having recorded and stored thereon instructions that, when executed, perform the actions of:
   presenting to a user an image of a figure having anatomical features, the anatomical features including facial features and limbs;
   enabling the user to manipulate the figure by changing a positioning of at least one anatomical feature within the presented image, wherein the positioning of the anatomical features on the figure corresponds to a password;
   receiving a manipulated image of the figure by the user to at least one of the facial features or at least one of the limbs of the figure, wherein the manipulated image includes a change in the positioning of at least one anatomical feature within the presented image including a change in the positioning of at least one of the facial features or at least one of the limbs of the figure; and
   providing access to a computing service based on a comparison of the manipulated image of the figure to a predefined arrangement of the positioning of the anatomical features including based on a comparison of the manipulated facial features and limbs of the figure to a predefined facial feature and limb arrangement corresponding to the password set by the user.

7. The non-transitory recordable storage medium of claim 6 wherein:

instructions that, when executed, perform the action of presenting to the user the figure comprise instructions that, when executed, perform the action of presenting to the user a three dimensional figure;

instructions that, when executed, perform the action of receiving the manipulated figure comprise instructions that, when executed, perform the action of receiving a manipulated three dimensional figure by the user, wherein the manipulated three dimensional figure includes a change in the positioning of at least one feature within the presented three dimensional figure; and instructions that, when executed, perform the action of providing access comprise instructions that, when executed, perform the action of providing access to the computing service based on a comparison of the manipulated three dimensional figure to a predefined arrangement of the three dimensional figure set by the user.

8. The non-transitory recordable storage medium of claim 6 wherein the manipulated figure is received by a user manipulating the figure on a touch screen interface.

9. The non-transitory recordable storage medium of claim 6 wherein instructions that, when executed, perform the action of providing access to the computing service comprise instructions that, when executed, perform the action of unlocking a mobile computing device.

10. The non-transitory recordable storage medium of claim 6 wherein instructions that, when executed, perform the action of providing access to the computing service comprise instructions that, when executed, perform the action of serving to the user a web page.

11. A computer-implemented access control system, comprising:

a graphical user interface programmed to display an image of a figure having anatomical features to a user, the anatomical features including facial features and limbs;

memory storing a predefined arrangement of a positioning of the anatomical features of the figure set by the user including a predefined facial feature and limb arrangement, wherein the positioning of the anatomical features on the figure including the facial feature and limb arrangement corresponds to a password; and a processor programmed to compare a manipulated image of the positioning of the anatomical features of the features input by the user to the predefined arrangement of the positioning of the facial and limb features of the figure set by the user as the password, and to initiate access by the user to a computing service, wherein the manipulated image includes a change in the positioning of at least one anatomical feature within the presented image including a change of at least one of the facial features or at least one of the limbs.

12. A computer-implemented method, comprising:

presenting to a user an image of a figure having anatomical features, the anatomical features including facial features and limbs;

enabling the user to manipulate the figure by changing a positioning of at least one anatomical feature within the presented image, wherein the positioning of the anatomical features on the figure corresponds to a password;

receiving a manipulated image of the figure by the user to at least one of the facial features or at least one of the limbs of the figure, wherein the manipulated image includes a change in the positioning of at least one anatomical feature within the presented image including a change in the positioning of at least one of the facial features or at least one of the limbs of the figure; and providing access to an electronic device based on a comparison of the manipulated image of the figure by the user to a predefined arrangement of the positioning of the anatomical features including based on a comparison of the manipulated facial features and limbs of the figure to a predefined facial feature and limb arrangement corresponding to the password set by the user.

13. The computer-implemented method of claim 12 wherein providing access to the electronic device comprises unlocking a music device.

14. The computer-implemented method of claim 12 wherein providing access to the electronic device comprises unlocking a game device.

* * * * *